United States Patent
Okada

(10) Patent No.: US 7,446,811 B2
(45) Date of Patent: Nov. 4, 2008

(54) DRIVING CONTROLLER AND METHOD FOR DRIVING PLURAL DRIVING UNITS AND IMAGE SENSING APPARATUS

(75) Inventor: Hiroyuki Okada, Izumi (JP)

(73) Assignee: Minolta Co., Ltd., Osaka (JP)

( * ) Notice: Subject to any disclaimer, the term of this patent is extended or adjusted under 35 U.S.C. 154(b) by 701 days.

(21) Appl. No.: 10/647,453

(22) Filed: Aug. 26, 2003

(65) Prior Publication Data

US 2005/0259155 A1 Nov. 24, 2005

(30) Foreign Application Priority Data

Apr. 25, 2003 (JP) ............... 2003-121001

(51) Int. Cl.
G03B 13/00 (2006.01)
(52) U.S. Cl. .................... 348/357; 348/219.1
(58) Field of Classification Search ........... 348/357, 348/355, 359, 360, 361, 219.1
See application file for complete search history.

(56) References Cited

U.S. PATENT DOCUMENTS

| | | | | |
|---|---|---|---|---|
| 4,977,457 A | * | 12/1990 | Tamekuni et al. ............ 348/348 |
| 5,214,466 A | * | 5/1993 | Nagano et al. ................ 396/51 |
| 5,287,223 A | * | 2/1994 | Hirasawa ...................... 359/697 |
| 5,321,459 A | * | 6/1994 | Uenaka ......................... 396/95 |
| 5,359,382 A | * | 10/1994 | Uenaka ......................... 396/95 |
| 5,740,472 A | * | 4/1998 | Hirano .......................... 396/55 |
| 5,768,038 A | * | 6/1998 | Emura ......................... 359/824 |
| 5,878,289 A | * | 3/1999 | Nakata et al. ................. 396/91 |
| 5,949,586 A | * | 9/1999 | Hirasawa et al. ............. 359/698 |
| 6,097,896 A | * | 8/2000 | Usui ............................. 396/55 |
| 6,134,057 A | | 10/2000 | Ueyama et al. |
| 6,269,580 B1 | * | 8/2001 | Suzuki .......................... 42/119 |
| 6,639,625 B1 | * | 10/2003 | Ishida et al. ............... 348/218.1 |
| 6,757,011 B1 | * | 6/2004 | Takeda et al. ............ 348/208.7 |
| 6,940,542 B2 | * | 9/2005 | Kitazawa et al. ....... 348/208.99 |
| 6,992,700 B1 | * | 1/2006 | Sato et al. ................ 348/208.2 |
| 2001/0017665 A1 | * | 8/2001 | Ackermann et al. ......... 348/374 |
| 2002/0196347 A1 | | 12/2002 | Masanori et al. |
| 2003/0076421 A1 | * | 4/2003 | Dutta .................... 348/208.11 |
| 2004/0012304 A1 | | 1/2004 | Ryuichi et al. |

FOREIGN PATENT DOCUMENTS

| | | |
|---|---|---|
| JP | 5-151580 | 6/1993 |
| JP | 6-238540 | 8/1994 |
| JP | 10-039356 | 2/1998 |
| JP | 10-098891 | 4/1998 |
| JP | 11-231198 | 8/1999 |

(Continued)

*Primary Examiner*—David Ometz
*Assistant Examiner*—Usman Khan
(74) *Attorney, Agent, or Firm*—McDermott Will & Emery LLP

(57) ABSTRACT

A driving controller is adapted for controlling driving of a plurality of driving units physically connected with one another, at least one of which includes a driving member frictionally engaged with a driven member. It is detected whether the driven member is being driven at a predetermined time. The unit including the driving member and another driving unit are driven at a predetermined timing when the detecting circuit detects the driven member is not driven at the predetermined time. The driven member and the driving member can be easily released from an adhered state.

21 Claims, 24 Drawing Sheets

FOREIGN PATENT DOCUMENTS

| | | |
|---|---|---|
| JP | 2000-184757 | 6/2000 |
| JP | P2000-184757 | 6/2000 |
| JP | 2000-245177 | 9/2000 |
| JP | 2001-103772 | 4/2001 |
| JP | P2001-103772 | 4/2001 |
| JP | P2002-131611 | 5/2002 |
| JP | P2002-189165 | 7/2002 |
| JP | 2002-218773 | 8/2002 |
| JP | 2002-354336 | 12/2002 |
| JP | 2002-365540 | 12/2002 |
| JP | 2003-010581 | 1/2003 |
| JP | P2003-33053 | 1/2003 |

* cited by examiner

DRIVING CONTROLLER AND METHOD FOR DRIVING PLURAL DRIVING UNITS AND IMAGE SENSING APPARATUS

This application is based on patent application No. 2003-121001 filed in Japan, the contents of which are hereby incorporated by references.

BACKGROUND OF THE INVENTION

This invention relates to a driving controller and an image sensing apparatus which is provided with such a driving controller, in particular to a driving controller which is useful for a driving mechanism including a plurality of driving units having a driven member and a driving member are held by a frictional engagement.

A driving unit has been conventionally known which includes an impact-type piezoelectric actuator constructed such that a driven member having a taking lens or the like mounted thereon is so coupled to a bar-shaped driving member to have a specified frictional force and a piezoelectric element is secured to one end of the driving member. An electronic apparatus, e.g., image sensing apparatuses, using such a driving unit are also known (for example, see Japanese Unexamined Patent Publication No. 2001-103772).

In the driving unit including the impact-type piezoelectric actuator, if the driven member and the driving member are left in contact for a long time without being driven, the driving member and the driven member are adhered to each other by resin on the outer surface of the driving member. Thus, there has been an undesirable possibility that the driven member is not driven even if a drive voltage is applied to the driving unit.

In order to solve such a problem, a way of releasing a driven member and a driving member from an adhered state by changing a driving frequency and a drive voltage has been proposed (for example, see Japanese Unexamined Patent Publication No. 2001-184757).

However, a vibration motor or ultrasonic motor in the latter publication is such that a ring-shaped piezoelectric element formed on one end surface of a resilient vibrator or stator is excited to generate a progressive wave on the outer surface of the stator, and a slider is pressingly mounted on the stator at a specific pressure to be driven by a frictional force acting between the slider and the stator. Thus, for such an actuator as to drive a driven member engaged with the driving member with a specific frictional force by securing one end of the layered piezoelectric element to a supporting member and the other end thereof to a rod-shaped driving member and causing the piezoelectric element to elongate and shrink, the driven member and the driving member cannot be released from the adhered state in some cases according to the way of the latter publication.

SUMMARY OF THE INVENTION

It is an object of the present invention to provide a driving controller and an image sensing apparatus which are free from the problems residing in the prior art.

According to an aspect of the present invention, a driving controller is adapted for controlling driving of a plurality of driving units physically connected with one another, at least one of which includes a driving member frictionally engaged with a driven member. It is detected whether the driven member is being driven at a predetermined time. The unit including the driving member and another driving unit are driven at a predetermined timing when the detecting circuit detects the driven member is not driven at the predetermined time.

These and other objects, features and advantages of the present invention will become more apparent upon reading the following detailed description along with the accompanying drawings.

DETAILED DESCRIPTION OF THE PREFERRED EMBODIMENTS OF THE INVENTION

Figure 1:
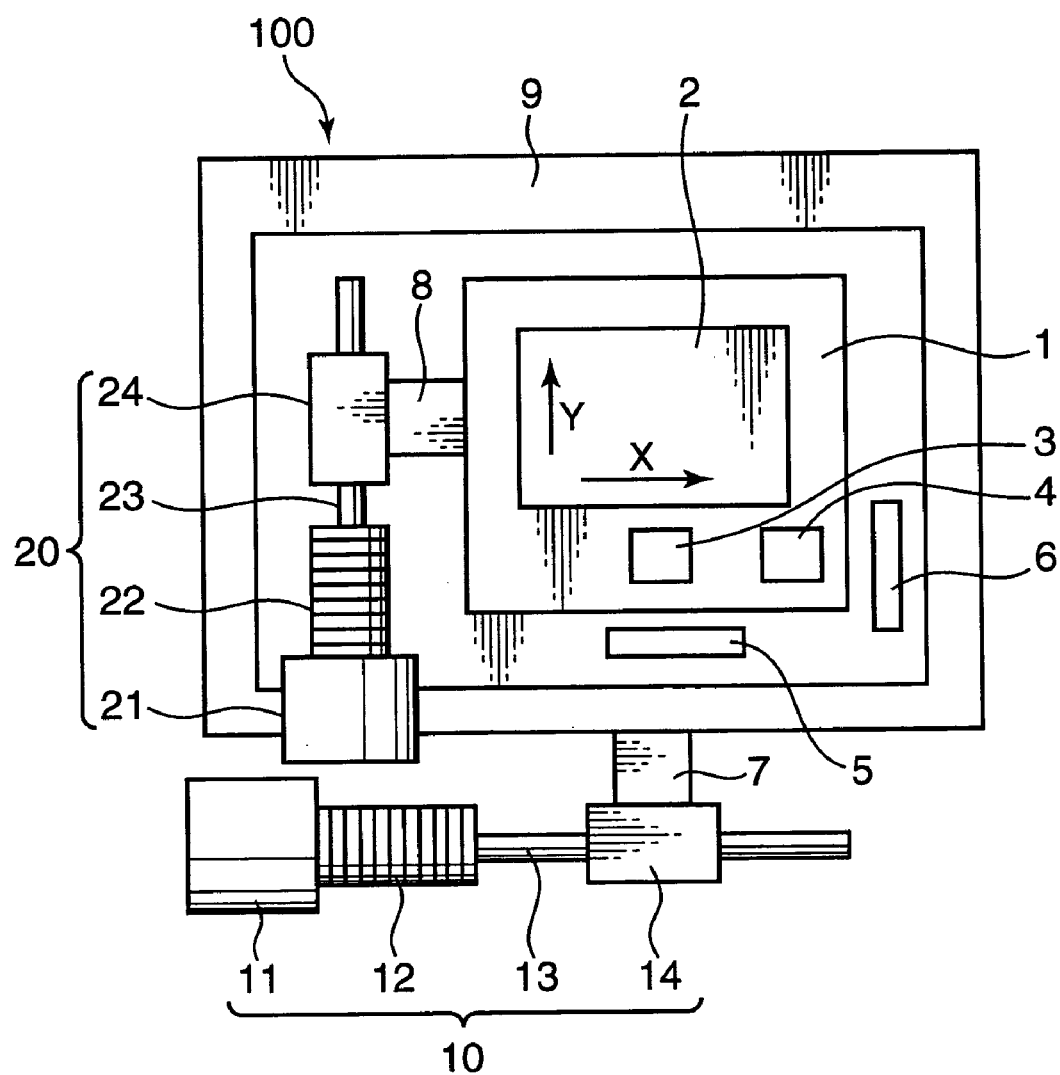
FIG. 1 is a diagram showing a driving mechanism of an image sensing apparatus provided with a driving controller according to an embodiment of the invention.

Preferred embodiments of the present invention are described below. It should be noted that the same construction is identified by the same reference numerals in the respective drawings and no description is given thereon.

Referring to FIG. 1 showing a driving mechanism of an image sensing apparatus according to an embodiment of the invention, a driving mechanism 100 is adapted for shake correction for an image sensing apparatus, and includes a sensing-device board 1, an image sensing device 2, a first LED (Light-Emitting Diode) 3, a second LED 4, a first PSD (Position Sensitive Detector) 5, a second PSD 6, a first actuator 10, a second actuator 20, a first connecting member 7, a second connecting member 8, and a frame 9.

The sensing-device board 1 carries the image sensing device 2. The image sensing device 2 is comprised of the so-called Bayer single-plate color area sensor in which color filters of R (red), G (green) and B (Blue) are adhered checkerwise to the outer surfaces of CCDs (Charge Coupled Devices) of an area sensor having the CCDs two-dimensionally arrayed therein. A light image of an object focused by a taking lens (not shown) is converted into electrical signals. In the following description, the image sensing device 2 is referred to as the CCD 2.

The first LED 3 is fixedly attached to the CCD board 1 and projects a spot light to the first PSD 5 to detect a position along an X-axis direction of the CCD board 1. The second LED 4 is fixedly attached to the CCD board 1 and projects a spot light to the second PSD 6 to detect a position along a Y-axis direction of the CCD board 1.

The first PSD 5 is fixedly attached to a main body and outputs a current corresponding to an incident position of the spot light from the first LED 3. The position along the X-axis direction of the CCD board 1 with respect to the main body is detected in accordance with an output signal of the first PSD 5.

The second PSD 6 is fixedly attached to the main body and outputs a current corresponding to an incident position of the spot light from the second LED 4. The position along the Y-axis direction of the CCD board 1 with respect to the main body is detected in accordance with an output signal of the second PSD 6.

The first actuator 10 is adapted to move the CCD 2 along the X-axis direction, and includes a supporting member 11, a piezoelectric element 12, a driving member 13 and a driven member 14, and is fixedly attached to the unillustrated main body by the supporting member 11. The second actuator 20 is adapted to move the CCD 2 along the Y-axis direction, and includes a supporting member 21, a piezoelectric element 22, a driving member 23 and a driven member 24, and is fixedly attached to the unillustrated main body by the supporting member 21.

Each of the piezoelectric elements 12, 22 is a multi-layered piezoelectric element formed by placing a plurality of piezoelectric substrates having a specified thickness with an electrode provided between adjacent piezoelectric substrates, and elongates and shrinks in layered direction. Each piezoelectric element 12, 22 elongates and shrinks in response to a drive voltage applied from a driving circuit (not shown) and one end thereof with respect to the elongating/shrinking directions thereof is secured to the corresponding supporting member 11, 21 while the other end thereof is secured to one end of the corresponding driving member 13, 23 with respect to longitudinal direction. Such layered piezoelectric elements have a higher resonance frequency because of their higher elastic stiffness as compared to a bimorph element and, accordingly, have an advantageous effect of a quick response speed. These multi-layered piezoelectric elements have another advantageous effect that a generating force is incommensurably larger as compared to the bimorph element. The thickness of the piezoelectric substrates is determined by the elongation rate, number of layers, and applied voltage required based on specification. The driven members 14, 24 are movable on the driving members 13, 23 along longitudinal direction.

The driving members 13, 23 are guides for translating the elongating and shrinking motions of the piezoelectric elements 12, 22 into movements of the movable members 14, 24 and supporting the movable members 14, 24. The cross section of the driving members 13, 23 may take a circular, elliptical, rectangular or like shape. In order to stably support and smoothly move the movable members 14, 24, the driving members 13, 23 have a circular cross section in this embodiment.

The actuators 10, 20 thus constructed relatively move the driven members 14, 24 with respect to the driving members 13, 23 taking advantage of a difference between frictional forces acting between the driving members 13, 23 and the driven members 14, 24 when the driving members 13, 23 are moved at different speeds along longitudinal direction. Specifically, the frictional forces acting between the driven members 14, 24 and the driving members 13, 23 decrease when the driving members 13, 23 are moved at high speeds while increasing when they are moved at low speeds. Thus, the driving members 13, 23 are moved at low speeds at the time of a movement in positive direction while being moved at high speeds at the time of a movement in negative direction, whereby the driven members 14, 24 are moved in positive direction with respect to the driving members 13, 23 (positive-direction movement). The driving members 13, 23 are moved at high speeds at the time of a movement in positive direction while being moved at low speeds at the time of a movement in negative direction, whereby the driven members 14, 24 are moved in negative direction with respect to the driving members 13, 23 (negative-direction movement).

The first connecting member 7 is adapted to connect the driven member 14 of the first actuator 10 and the frame 9. The driven member 14 of the first actuator 10 and the frame 9 are moved together by the first connecting member 7.

The second connecting member 8 is adapted to connect the driven member 24 of the second actuator 20 and the CCD board 1. The driven member 24 of the second actuator 20 and the CCD board 1 are moved together by the second connecting member 8.

The frame 9 is so arranged as to surround the CCD board 1 and the supporting member 21 of the second actuator 20 is secured thereto.

In this shake correcting mechanism, accelerations of the CCD 2 along X-axis and Y-axis directions are detected by acceleration sensors (not shown), driving amounts of the CCD 2 along X-axis and Y-axis directions are calculated based on the detected accelerations, and the first and second actuators 10, 20 are driven based on the calculated driving amounts, whereby the CCD 2 can be constantly moved to an optimal position for image sensing.

Figure 2:
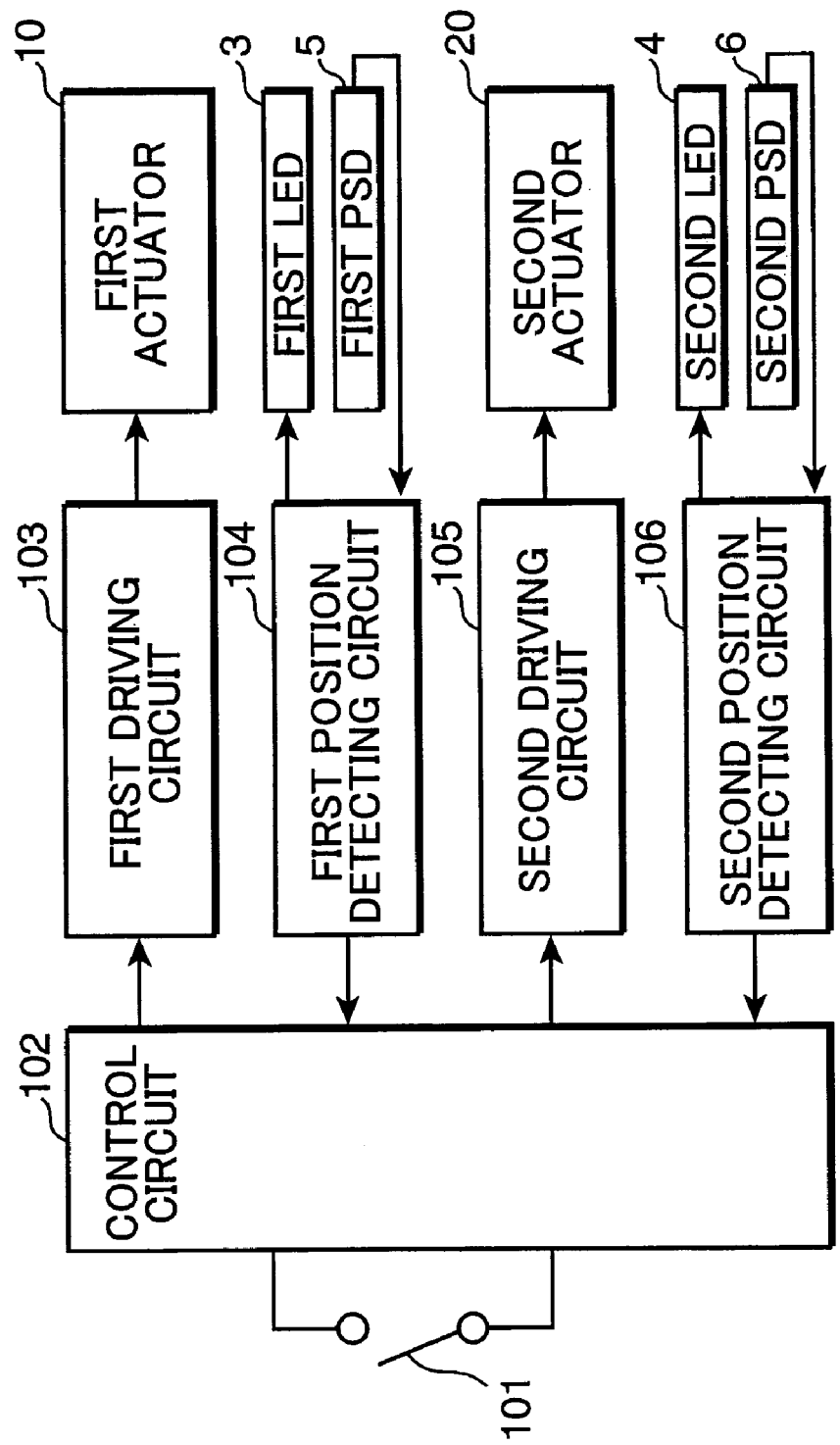
FIG. 2 is a block diagram showing a construction of the driving controller.

FIG. 2 is a block diagram showing a construction of a driving controller of this embodiment. The driving controller includes a control circuit 102, a first driving circuit 103 for driving the first actuator 10, a first position detecting circuit 104, the first LED 3, the first PSD 5, a second driving circuit 105 for driving the second actuator 20, a second position detecting circuit 106, the second LED 4 and the second PSD 6.

A main switch 101 is connected with the control circuit 2. The main switch 101 is used to turn a power supply on and off. The control circuit 102 is comprised of a CPU (Central Processing Unit) or the like and includes a ROM (Read Only Memory) and a RAM (Random Access Memory). The ROM is adapted to store a control program for controlling the operation of the CPU of the control circuit 102, and the RAM is adapted to temporarily save various data in calculation processing and control processing. The control circuit 102 is connected with the main switch 101, the first driving circuit 103, the first position detecting circuit 104, the second driving circuit 105 and the second position detecting circuit 106, and controllably drives the first and second actuators 10, 20 in accordance with output signals from the main switch 101, the first position detecting circuit 104 and the second position detecting circuit 106.

The first driving circuit 103 is connected with the piezoelectric element 12 of the first actuator 10 and causes the driving member 13 to elongate and shrink by applying a specified drive voltage to the piezoelectric element 12, thereby driving the driven member 14.

The first position detecting circuit 104 causes the first LED 3 to emit light. A light current corresponding to a light-receiving position on a light-receiving surface of the first PSD 5 is inputted to the first position detecting circuit 104, which in turn detects a position of the CCD 2 along X-axis direction based on the received light current. The first position detecting circuit 104 detects the position of the CCD 2 along X-axis direction to detect the position of the driven member 14 of the first actuator 10.

The second driving circuit 105 is connected with the piezoelectric element 22 of the second actuator 20 and causes the driving member 23 to elongate and shrink by applying a specified drive voltage to the piezoelectric element 22, thereby driving the driven member 24.

The second position detecting circuit 106 causes the second LED 4 to emit light. A light current corresponding to a light-receiving position on a light-receiving surface of the second PSD 6 is inputted to the second position detecting circuit 106, which in turn detects a position of the CCD 2 along Y-axis direction based on the received light current. The second position detecting circuit 106 detects the position of the CCD 2 along Y-axis direction to detect the position of the driven member 24 of the second actuator 20.

It should be noted that the first and second actuators 10, 20 correspond to driving units; the first and second driving circuits 103, 105 correspond to a driving circuit; and the first and second position detecting circuits 104, 105 correspond to a detecting circuit.

Figure 3:
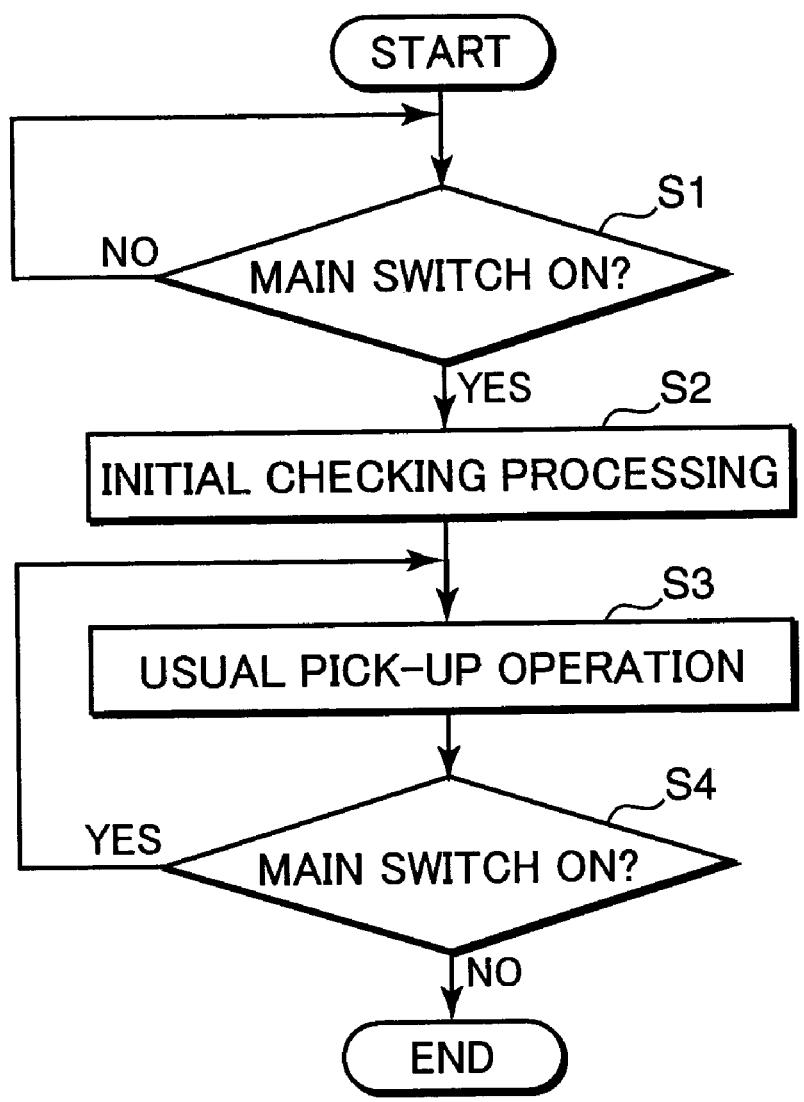
FIG. 3 is a flowchart showing a primary flow of the image sensing apparatus.

Referring to FIG. 3 showing a primary processing in the image sensing apparatus, in Step S1, the control circuit 102 judges whether the main switch 101 is on and, proceeds to Step S2 if the main switch 101 is on (YES in Step S1) while waiting on standby until the main switch 101 is turned on if the main switch 101 is off (NO in Step S1).

In Step S2, the control circuit 102 executes an initial checking processing for properly driving the actuators 10, 20. This initial checking processing is described later.

In Step S3, the control circuit 102 performs a usual pick-up operation such as a photographing operation.

In Step S4, the control circuit 102 judges whether the main switch 101 is on and, proceeds to Step S3 if the main switch 101 is on (YES in Step S4) while ending the photographing operation if the main switch 101 is off (NO in Step S4).

Figure 4:
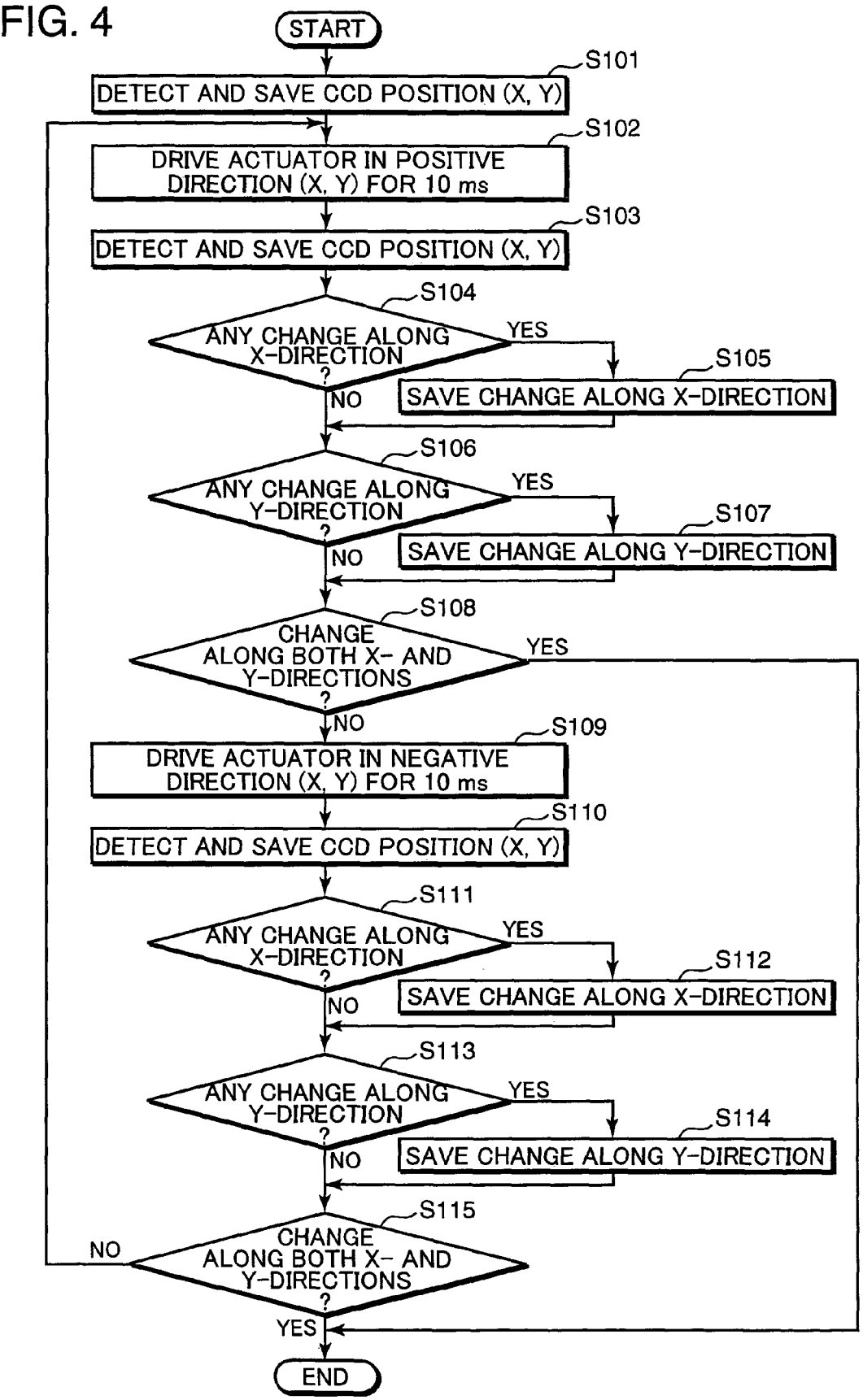
FIG. 4 is a flowchart showing an initial checking processing in Step S2 of the flow shown in FIG. 3.

Referring to FIG. 4 showing the initial checking processing in Step S2 of the flow shown in FIG. 3, in Step S101, the first position detecting circuit 104 detects an initial position thereof the CCD 2 along X-axis direction and outputs the detected initial position to the control circuit 102. The control circuit 102 saves the initial position of the CCD 2 along X-axis direction received from the first position detecting circuit 104. Further, the second position detecting circuit 106 detects an initial position of the CCD 2 along Y-axis direction and outputs the detected initial position to the control circuit 102. The control circuit 102 saves the initial position of the CCD 2 along Y-axis direction received from the second position detecting circuit 106.

In Step S102, the control circuit 102 simultaneously drives the first and second actuators 10, 20 in positive direction for a specified period. Although the specified period during which the control circuit 102 simultaneously drives the first and second actuators 10, 20 in positive direction is 10 ms in this embodiment, the present invention is not particularly limited thereto. For example, a suitable period obtained by an experiment on driving may be set.

In Step S103, the first position detecting circuit 104 detects a position of the CCD 2 along X-axis direction and outputs the detected position to the control circuit 102. The control circuit 102 saves the position of the CCD 2 along X-axis direction received from the first position detecting circuit 104. Further, the second position detecting circuit 106 detects a position of the CCD 2 along Y-axis direction and outputs the detected position to the control circuit 102. The control circuit 102 saves the position of the CCD 2 along Y-axis direction received from the second position detecting circuit 106.

In Step S104, the control circuit 102 compares the position of the CCD 2 along X-axis direction after the actuators 10, 20 were driven and the initial position thereof and judges whether the CCD 2 has moved along X-axis direction. Here, if the position of the CCD 2 along X-axis direction after the actuators 10, 20 were driven and the initial position thereof differ, i.e., if the position of the CCD 2 has changed from the initial position (YES in Step S104), Step S105 follows. If these two positions coincide, i.e., if the position of the CCD 2 has not changed from the initial position (NO in Step S104), Step S106 follows.

In Step S105, the control circuit 102 saves a change in the position of the CCD 2 along X-axis direction. In other words, the control circuit 102 saves the position of the driven member 14 moved from the initial position after simultaneously driving the first and second actuators 10, 20 in positive direction for the specified period.

In Step S106, the control circuit 102 compares the position of the CCD 2 along Y-axis direction after the actuators 10, 20 were driven and the initial position thereof and judges whether the CCD 2 has moved along Y-axis direction. Here, if the position of the CCD 2 along Y-axis direction after the actuators 10, 20 were driven and the initial position thereof differ, i.e., if the position of the CCD 2 has changed from the initial position (YES in Step S106), Step S107 follows. If these two positions coincide, i.e., if the position of the CCD 2 has not changed from the initial position (NO in Step S106), Step S108 follows.

In Step S107, the control circuit 102 saves a change in the position of the CCD 2 along Y-axis direction. In other words, the control circuit 102 saves the position of the driven member 24 moved from the initial position after simultaneously driving the second and second actuators 10, 20 in positive direction for the specified period.

In Step S108, the control circuit 102 judges whether the CCD 2 has moved both along X-axis direction and along Y-axis direction. Here, if the position of the CCD 2 has changed both along X-axis direction and along Y-axis direction (YES in Step S108), this processing is completed since the first and second actuators 10, 20 both properly operate. If the CCD 2 has moved neither along X-axis direction nor along Y-axis direction, if it has moved only along X-axis direction without moving along Y-axis direction and if it has moved only along Y-axis direction without moving along X-axis direction (NO in Step S108), Step S109 follows to drive the first and second actuators 10, 20 again.

In Step S109, the control circuit 102 simultaneously drives the first and second actuators 10, 20 in negative direction for a specified period. Although the specified period during which the control circuit 102 simultaneously drives the first and second actuators 10, 20 in negative direction is 10 ms in this embodiment, the present invention is not particularly limited thereto. For example, a suitable period obtained by an experiment on driving may be set.

In Step S110, the position detecting circuit 104 detects the position of the CCD 2 along X-axis direction and outputs the detected position to the control circuit 102. The control circuit 102 saves the position of the CCD 2 along X-axis direction received from the first position detecting circuit 104. Further, the position detecting circuit 106 detects the position of the CCD 2 along Y-axis direction and outputs the detected position to the control circuit 102. The control circuit 102 saves the position of the CCD 2 along Y-axis direction received from the second position detecting circuit 106.

In Step S111, the control circuit 102 compares the position of the CCD 2 along X-axis direction after the actuators 10, 20 were driven in negative direction and the position of the CCD 2 along X-axis direction before the actuators 10, 20 were driven in negative direction (after driving in positive direction) and judges whether the CCD 2 has moved along X-axis direction. Here, if the positions of the CCD 2 along X-axis direction after and before the actuators 10, 20 were driven in negative direction differ, i.e., if the position of the CCD 2 along X-axis direction after the actuators 10, 20 were driven in negative direction has changed from the position thereof along X-axis direction before the actuators 10, 20 were driven in negative direction (YES in Step S111), Step S112 follows. If these two positions coincide, i.e., if the position of the CCD 2 along X-axis direction after the actuators 10, 20 were driven in negative direction has not changed from the position thereof along X-axis direction before the actuators 10, 20 were driven in negative direction (NO in Step S111), Step S113 follows.

In Step S112, the control circuit 102 saves a change in the position of the CCD 2 along X-axis direction. In other words, the control circuit 102 saves the position of the driven member 14 moved from the initial position after simultaneously driving the first and second actuators 10, 20 in negative direction for the-specified period.

In Step S113, the control circuit 102 compares the position of the CCD 2 along Y-axis direction after the actuators 10, 20 were driven in negative direction and the position of the CCD 2 along Y-axis direction before the actuators 10, 20 were driven in negative direction (after driving in positive direction) and judges whether the CCD 2 has moved along Y-axis direction. Here, if the positions of the CCD 2 along Y-axis direction after and before the actuators 10, 20 were driven in negative direction differ, i.e., if the position of the CCD 2 along Y-axis direction after the actuators 10, 20 were driven in negative direction has changed from the position thereof along Y-axis direction before the actuators 10, 20 were driven in negative direction (YES in Step S113), Step S114 follows. If these two positions coincide, i.e., if the position of the CCD 2 along Y-axis direction after the actuators 10, 20 were driven in negative direction has not changed from the position thereof along Y-axis direction before the actuators 10, 20 were driven in negative direction (NO in Step S113), Step S115 follows.

In Step S114, the control circuit 102 saves a change in the position of the CCD 2 along Y-axis direction. In other words, the control circuit 102 saves the position of the driven member 24 moved from the initial position after simultaneously driving the first and second actuators 10, 20 in negative direction for the specified period.

In Step S115, the control circuit 102 judges whether the CCD 2 has moved both along X-axis direction and along Y-axis direction. Here, if the position of the CCD 2 has changed both along X-axis direction and along Y-axis direction (YES in Step 115), this processing is completed since the first and second actuators 10, 20 both properly operate. If the CCD 2 has moved neither along X-axis direction nor along Y-axis direction, if it has moved only along X-axis direction without moving along Y-axis direction and if it has moved only along Y-axis direction without moving along X-axis direction (NO in Step S115), Step S102 follows to drive the first and second actuators 10, 20 again and the operations in Step S102 and succeeding Steps are performed.

In this embodiment, if the judgment result is negative in Step S115, Step S102 follows to perform the operations in Step S102 and succeeding Steps again. However, if either one of the first actuator 10 for moving the CCD 2 along X-axis direction and the second actuator 20 for moving the CCD 2 along Y-axis direction was properly driven in the first processing of Steps S102 to S115, only the actuator not having been properly driven may be driven without driving the actuator having been properly driven in the next processing of Steps S102 to S115.

Alternatively, in this embodiment, if at least one of the first actuator 10 for moving the CCD 2 along X-axis direction and the second actuator 20 for moving the CCD 2 along Y-axis direction was not properly driven in the first processing of Steps S102 to S115, the first and second actuators 10, 20 may be driven at a higher drive torque in the next processing of Steps S102 to S115 than in the first processing.

In this way, the driven members 14, 24 and the driving members 13, 23 are held by the frictional engagement in the first and second actuators 10, 20, and the first and second actuators 10, 20 are simultaneously driven when the main switch 101 is turned on to apply a power or when the driving of the first or second actuator 10 or 20 is started. When the first and second actuators 10, 20 are simultaneously driven, whether or not the driven members 14 and 24 are being driven is detected. Here, unless the driving of the driven members 14, 24 is confirmed, the first and second actuators 10, 20 are simultaneously driven. Further, if the driving of the driven members 14, 24 is confirmed, the first and second actuators 10, 20 perform their original operations.

Accordingly, in the case that the driven member 14, 24 and the driving member 13, 23 are adhered to each other in the first actuator 10 in which the driven member 14 and the driving member 13 are held by the frictional engagement or in the second actuator 20 in which the driven member 24 and the driving member 23 are held by the frictional engagement, vibration during the driving of the first and second actuators 10, 20 is transmitted by simultaneously driving the first and second actuators 10, 20. Thus, the driven member 14 and the driving member 13 of the first actuator 10 or the driven member 24 and the driving member 23 of the second actuator 20 can be released from the adhered state by the transmitted vibration.

Next, a modification of the previous embodiment of the present invention is described. In the previous embodiment, the vibration of one actuator is transmitted to the other actuator by simultaneously driving the first and second actuators 10, 20, thereby releasing the driven members and the driving members of the respective actuators from the adhered state. However, in the modification of the previous embodiment, the first and second actuators 10, 20 are successively driven to transmit the vibration of one actuator to the other actuator, thereby releasing the driven members and the driving members of the respective actuators from the adhered state.

No description is given on a driving mechanism of the modification since it differs from that of the previous embodiment only in a control algorithm of the control circuit shown in FIG. 2. Only an initial checking processing different from that of the previous embodiment is described here.

Figure 5:
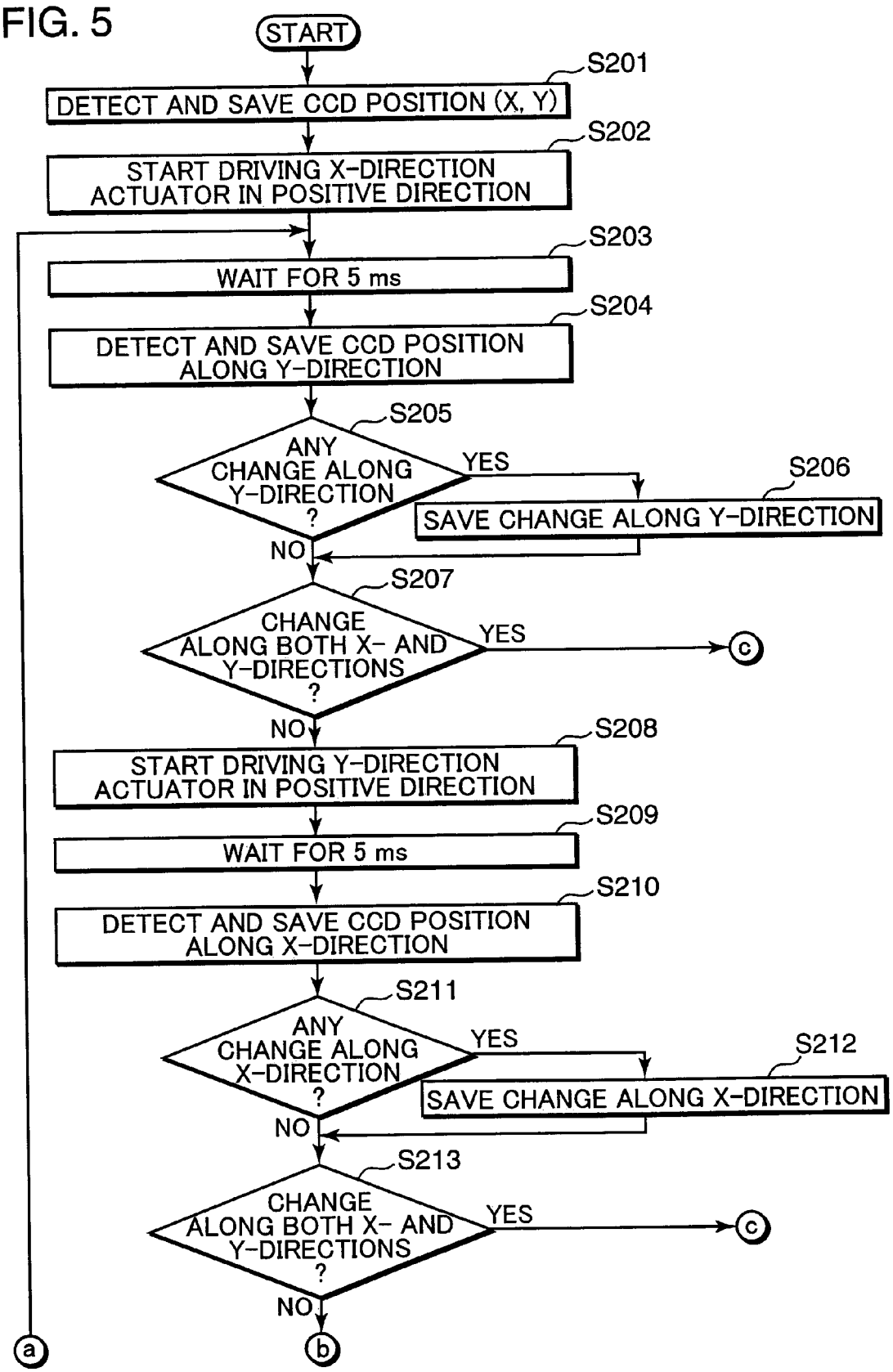
FIGS. 5 and 6 are a flowchart showing a modified initial checking processing in Step S2 of the flow shown in FIG. 3.
Figure 6:
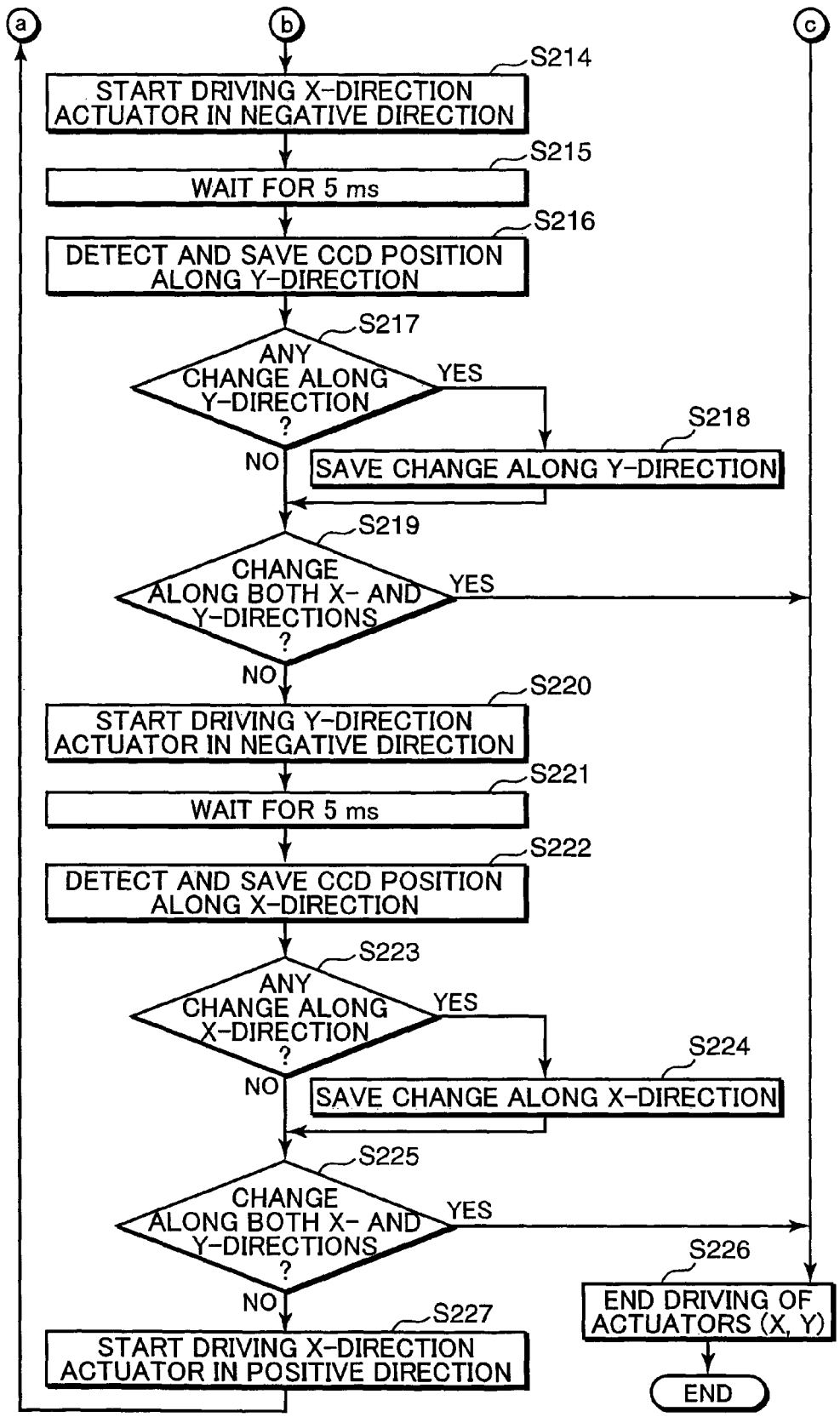

Referring to FIGS. 5 and 6 showing the initial checking processing in Step S2 of FIG. 3 according to the modification where it should be noted that a, b, c, in FIG. 5 correspond to a, b, c in FIG. 6, in Step S201, the first position detecting circuit 104 detects an initial position of the CCD 2 along X-axis direction and outputs the detected initial position to the control circuit 102. The control circuit 102 saves the initial position of the CCD 2 along X-axis direction received from the first position detecting circuit 104. Further, the second position detecting circuit 106 detects an initial position of the CCD 2 along Y-axis direction and outputs the detected initial position to the control circuit 102. The control circuit 102 saves the initial position of the CCD 2 along Y-axis direction received from the second position detecting circuit 106.

In Step S202, the control circuit 102 starts driving the first actuator 10 in positive direction.

After the lapse of a specified period following the start of driving the first actuator 10 in positive direction (Step S203), the second position detecting circuit 106 detects a position of the CCD 2 along Y-axis direction and outputs the detected initial position to the control circuit 102 in Step S204. The control circuit 102 saves the initial position of the CCD 2 along Y-axis direction received from the second position detecting circuit 106. Although the specified period lasting until the second position detecting circuit 106 detects the position of the CCD 2 along Y-axis direction after the control circuit 102 started driving the first actuator 10 in positive direction is 5 ms in this modification, the present invention is not particularly limited thereto. For example, a suitable period obtained by an experiment on driving may be set.

In Step S205, the control circuit 102 compares the position of the CCD 2 along Y-axis direction after the first actuator 10 was driven and the initial position thereof and judges whether the CCD 2 has moved along Y-axis direction. Here, if the position of the CCD 2 along Y-axis direction after the first actuator 10 was driven and the initial position thereof differ, i.e., if the position of the CCD 2 has changed from the initial position (YES in Step S205), Step S206 follows. If these two positions coincide, i.e., if the position of the CCD 2 has not changed from the initial position (NO in Step S205), Step S207 follows. It should be noted that the CCD 2 does not move along Y-axis direction when the initial checking processing is performed at first since the second actuator 20 is not driven and, therefore, the judgment result in Step S205 is negative.

In Step S206, the control circuit 102 saves a change in the position of the CCD 2 along Y-axis direction. In other words, the control circuit 102 saves the position of the driven member 24 moved from the initial position in the case that the position of the CCD 2 has changed along Y-axis direction.

In Step S207, the control circuit 102 judges whether the CCD 2 has moved both along X-axis direction and along Y-axis direction. Here, if the position of the CCD 2 has changed both along X-axis direction and along Y-axis direction (YES in Step S207), Step S226 follows since the first and second actuators 10, 20 both properly operate. If the CCD 2 has moved neither along X-axis direction nor along Y-axis direction, if it has moved only along X-axis direction without moving along Y-axis direction and if it has moved only along Y-axis direction without moving along X-axis direction (NO in Step S207), Step S208 follows to drive the second actuator 20 in positive direction. It should be noted the CCD 2 does not move along Y-axis direction when the initial checking processing is performed at first since the second actuator 20 is not driven and the CCD 2 does not move along X-axis direction, either, since the position of the CCD 2 along X-axis direction after the actuator 10 was driven is not detected and, therefore, the judgment result in Step S207 is negative.

In Step S208, the control circuit 102 starts driving the second actuator 20 in positive direction.

After the lapse of a specified period following the start of driving the second actuator 20 in positive direction (Step S209), the first position detecting circuit 104 detects a position of the CCD 2 along X-axis direction and outputs the detected position to the control circuit 102 in Step S210. The control circuit 102 saves the position of the CCD 2 along X-axis direction received from the first position detecting circuit 104. Although the specified period lasting until the first position detecting circuit 104 detects the position of the CCD 2 along X-axis direction after the control circuit 102 started driving the second actuator 20 in positive direction is 5 ms in this modification, the present invention is not particularly limited thereto. For example, a suitable period obtained by an experiment on driving may be set.

In Step S211, the control circuit 102 compares the position of the CCD 2 along X-axis direction after the actuator 20 was driven and the initial position thereof and judges whether the CCD 2 has moved along X-axis direction. Here, if the position of the CCD 2 along X-axis direction after the actuator 20 was driven and the initial position thereof differ, i.e., if the position of the CCD 2 has changed from the initial position (YES in Step S211), Step S212 follows. If these two positions coincide, i.e., if the position of the CCD 2 has not changed from the initial position (NO in Step S211), Step S213 follows.

In Step S212, the control circuit 102 saves a change in the position of the CCD 2 along X-axis direction. In other words, the control circuit 102 saves the position of the driven member 14 moved from the initial position in the case that the position of the CCD 2 has changed along X-axis direction.

In Step S213, the control circuit 102 judges whether the CCD 2 has moved both along X-axis direction and along Y-axis direction. Here, if the position of the CCD 2 has changed both along X-axis direction and along Y-axis direction (YES in Step S213), Step S226 follows since the first and second actuators 10, 20 both properly operate. If the CCD 2 has moved neither along X-axis direction nor along Y-axis direction, if it has moved only along X-axis direction without moving along Y-axis direction and if it has moved only along Y-axis direction without moving along X-axis direction (NO in Step S213), Step S214 follows to drive the first actuator 10 in negative direction.

In Step S214, the control circuit 102 starts driving the first actuator 10 in negative direction.

After the lapse of a specified period following the start of driving the first actuator 10 in negative direction (Step S215), the second position detecting circuit 106 detects a position of the CCD 2 along Y-axis direction and outputs the detected position to the control circuit 102 in Step S216. The control circuit 102 saves the position of the CCD 2 along Y-axis direction received from the second position detecting circuit 106. Although the specified period lasting until the second position detecting circuit 106 detects the position of the CCD 2 along Y-axis direction after the control circuit 102 started driving the first actuator 10 in negative direction is 5 ms in this modification, the present invention is not particularly limited thereto. For example, a suitable period obtained by an experiment on driving may be set.

In Step S217, the control circuit 102 compares the position of the CCD 2 along Y-axis direction after the first actuator 10 was driven and the initial position thereof and judges whether the CCD 2 has moved along Y-axis direction. Here, if the position of the CCD 2 along Y-axis direction after the first actuator 10 was driven and the initial position thereof differ, i.e., if the position of the CCD 2 has changed from the initial position (YES in Step S217), Step S218 follows. If these two positions coincide, i.e., if the position of the CCD 2 has not changed from the initial position (NO in Step S217), Step S219 follows.

In Step S218, the control circuit 102 saves a change in the position of the CCD 2 along Y-axis direction. In other words, the control circuit 102 saves the position of the driven member 24 moved from the initial position in the case that the position of the CCD 2 has changed along Y-axis direction.

In Step S219, the control circuit 102 judges whether the CCD 2 has moved both along X-axis direction and along Y-axis direction. Here, if the position of the CCD 2 has changed both along X-axis direction and along Y-axis direction (YES in Step S219), Step S226 follows since the first and second actuators 10, 20 both properly operate. If the CCD 2 has moved neither along X-axis direction nor along Y-axis direction, if it has moved only along X-axis direction without moving along Y-axis direction and if it has moved only along Y-axis direction without moving along X-axis direction (NO in Step S219), Step S220 follows to drive the second actuator 20 in negative direction.

In Step S220, the control circuit 102 starts driving the second actuator 20 in negative direction.

After the lapse of a specified period following the start of driving the second actuator 20 in negative direction (Step S221), the first position detecting circuit 104 detects a position of the CCD 2 along X-axis direction and outputs the detected position to the control circuit 102 in Step S222. The control circuit 102 saves the position of the CCD 2 along X-axis direction received from the first position detecting circuit 104. Although the specified period lasting until the first position detecting circuit 104 detects the position of the CCD 2 along X-axis direction after the control circuit 102 started driving the second actuator 20 in negative direction is 5 ms in this modification, the present invention is not particularly limited thereto. For example, a suitable period obtained by an experiment on driving may be set.

In Step S223, the control circuit 102 compares the position of the CCD 2 along X-axis direction after the second actuator 20 was driven and the initial position thereof and judges whether the CCD 2 has moved along X-axis direction. Here, if the position of the CCD 2 along X-axis direction after the second actuator 20 was driven and the initial position thereof differ, i.e., if the position of the CCD 2 has changed from the initial position (YES in Step S223), Step S224 follows. If these two positions coincide, i.e., if the position of the CCD 2 has not changed from the initial position (NO in Step S223), Step S225 follows.

In Step S224, the control circuit 102 saves a change in the position of the CCD 2 along X-axis direction. In other words, the control circuit 102 saves the position of the driven member 14 moved from the initial position in the case that the position of the CCD 2 has changed along X-axis direction.

In Step S225, the control circuit 102 judges whether the CCD 2 has moved both along X-axis direction and along Y-axis direction. Here, if the position of the CCD 2 has changed both along X-axis direction and along Y-axis direction (YES in Step S225), Step S226 follows since the first and second actuators 10, 20 both properly operate. If the CCD 2 has moved neither along X-axis direction nor along Y-axis direction, if it has moved only along X-axis direction without moving along Y-axis direction and if it has moved only along Y-axis direction without moving along X-axis direction (NO in Step S225), Step S227 follows to drive the first actuator 10 in positive direction.

In Step S226, the control circuit 102 stops driving the first and second actuators 10, 20 since the first and second actuators 10, 20 both properly operate, thereby completing the initial checking processing.

In Step S227, the control circuit 102 starts driving the first actuator 10 in positive direction and proceeds to Step S203 to perform the operations in Steps S203 and succeeding Steps.

In this modification, if either one of the first actuator 10 for moving the CCD 2 along X-axis direction and the second actuator 20 for moving the CCD 2 along Y-axis direction was not properly driven in the first processing of Steps S202 to S225, the first and second actuators 10, 20 may be driven at a higher drive torque in the next processing of Steps S203 to S225 than in the first processing.

In this way, the driven members 14, 24 and the driving members 13, 23 are held by the frictional engagement in the first and second actuators 10, 20, and the first and second actuators 10, 20 are successively driven when the main switch 101 is turned on to apply a power or when the driving of the first or second actuator 10 or 20 is started. When the first and second actuators 10, 20 are successively driven, whether or not the driven members 14 and 24 are being driven is detected. Here, unless the driving of the driven members 14, 24 is confirmed, the first and second actuators 10, 20 are successively driven. Further, if the driving of the driven members 14, 24 is confirmed, the first and second actuators 10, 20 perform their original operations.

Accordingly, in the case that the driven member 14, 24 and the driving member 13, 23 are adhered to each other in the first actuator 10 in which the driven member 14 and the driving member 13 are held by the frictional engagement or in the second actuator 20 in which the driven member 24 and the driving member 23 are held by the frictional engagement, vibration during the driving of one actuator is transmitted to the other by successively driving the first and second actuators 10, 20. Thus, the driven member 14 and driving member 13 of the first actuator 10 or the driven member 24 and the driving member 23 of the second actuator 20 can be released from the adhered state by the transmitted vibration.

Next, a second embodiment of the present invention is described. Although the driving mechanism 100 of the first embodiment is adapted for shake correction, the present invention is not particularly limited thereto and may be applied to a lens driving mechanism of an image sensing apparatus. In the second embodiment, a driving mechanism 200 is adapted for driving a lens of an image sensing apparatus.

Figure 7:
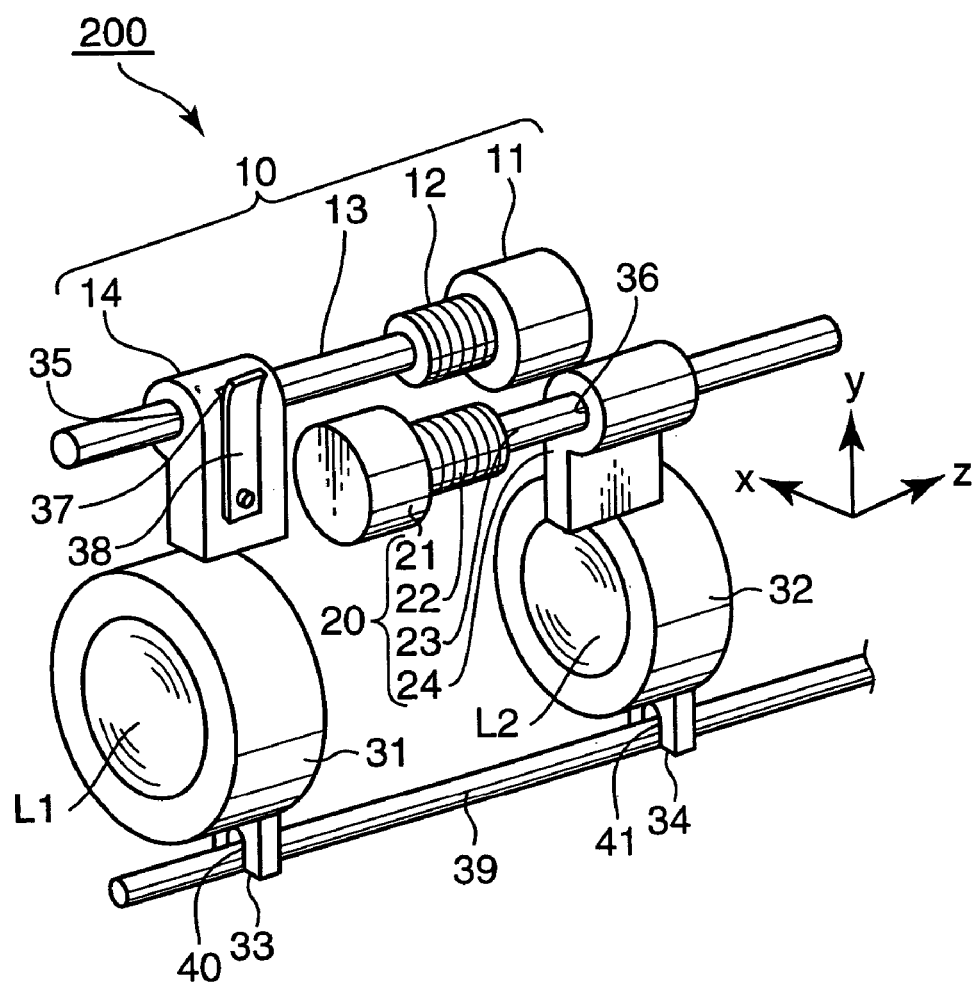
FIG. 7 is a diagram showing a driving mechanism of an image sensing apparatus according to a second embodiment of the invention.

Referring to FIG. 7 showing the lens driving mechanism 200, there are provided a first lens group L1, a second lens group L2, a first actuator 10 for driving the first lens group L1 along optical-axis direction, and a second actuator 20 for driving the second lens group L2 along optical-axis direction.

The first actuator 10 includes a supporting member 11, a piezoelectric element 12, a driving member 13 and a driven member 14. The second actuator 20 includes a supporting member 21, a piezoelectric element 22, a driving member 23 and a driven member 24. Each piezoelectric element 12, 22 elongates and shrinks in response to an applied drive voltage and one end surface thereof with respect to the elongating/ shrinking directions thereof is secured to the corresponding supporting member 11, 21 while the other end surface thereof is secured to one end of the corresponding driving member 13, 23. The driving members 13, 23 are arranged in parallel with optical-axis direction. The supporting members 11, 21 are located at the opposite sides with respect to forward and backward directions. In other words, the supporting member 11 for the first lens group L1 is located closer to the second lens group L2 than to the first lens group L1, i.e., located at the side of an image sensing device, whereas the supporting member 21 for the second lens group L2 is located closer to the first lens group L1 than to the second lens group L2, i.e., located at the side of an object.

The first and second lens groups L1, L2 are held in lens holders 31, 32, respectively. The driven members 14, 24 are provided at oblique upper portions of the lens holders 31, 32, and lower projections 33, 34 are provided at the bottoms of the driven members lens holders 31, 32.

The driven members 14, 24 are formed with through holes 35, 36 through which the driving members 13, 23 are introduced. An opening 37 for exposing the driving member 13 is formed in one side surface of the driven member 14 on the lens holder 31, and a leaf spring 38 for pressing the exposed driving member 13 with a suitable force is provided. The driving member 13 is held in sliding contact with the inner surface of the through hole 35 of the driven member 14 by the pressing force of the leaf spring 38. Although not shown, the driven member 24 on the lens holder 32 is similar constructed, and the driving member 23 is held in sliding contact with the inner surface of the through hole 36 of the driven member 24.

The lower projections 33, 34 are formed with U-shaped slots 40, 41 through which a guiding shaft 39 is introduced, thereby preventing the rotation of the lens holders 31, 32.

Next, the operation of the driving mechanism 200 is described. The first and second lens groups L1, L2 are driven along the driving members 13, 23 and the guiding shaft 39 by applying a voltage of a suitable waveform (e.g., serrated waveform, a rectangular waveform of a specified duty ratio, or the like) to the piezoelectric elements 12, 22.

For example, the piezoelectric elements 12, 22 are caused to gradually elongate (or shrink) by applying a moderately increasing (or decreasing) voltage to the piezoelectric elements 12, 22, whereby the driving members 13, 23 are slowly displaced along optical-axis direction. Thereupon, the lens holders 31, 32 are integrally moved with the driving members 13, 23 by frictional forces acting between the through holes 35, 36 of the driven members 14, 24 and the driving members 13, 23. Subsequently, the piezoelectric elements 12, 22 are caused to quickly shrink (or elongate) by applying a suddenly decreasing (or increasing) voltage to the piezoelectric elements 12, 22, whereby the driving members 13, 23 are quickly displaced in an opposite direction. Thereupon, a slip occurs between the through holes 35, 36 of the driven members 14, 24 and the driving members 13, 23, and the driving members 13, 23 return to their initial positions while the lens holders 31, 32 remain stationary due to inertial forces. In this way, the first and second lens groups L1, L2 can be driven in desired directions.

First and second LEDs for detecting the positions of the first and second lens groups L1, L2 are provided at specified positions in the lens holders 31, 32, whereas first and second PSDs are provided at positions in a main body where spot lights emitted from the first and second LEDs are received.

No description is given on a construction of a driving controller for the driving mechanism 200 of this embodiment since it is the same as the one shown in FIG. 2 and on the entire processing of this embodiment since it is the same as the entire processing shown in FIG. 3, and only an initial checking processing executed in Step S2 is described.

Figure 8:
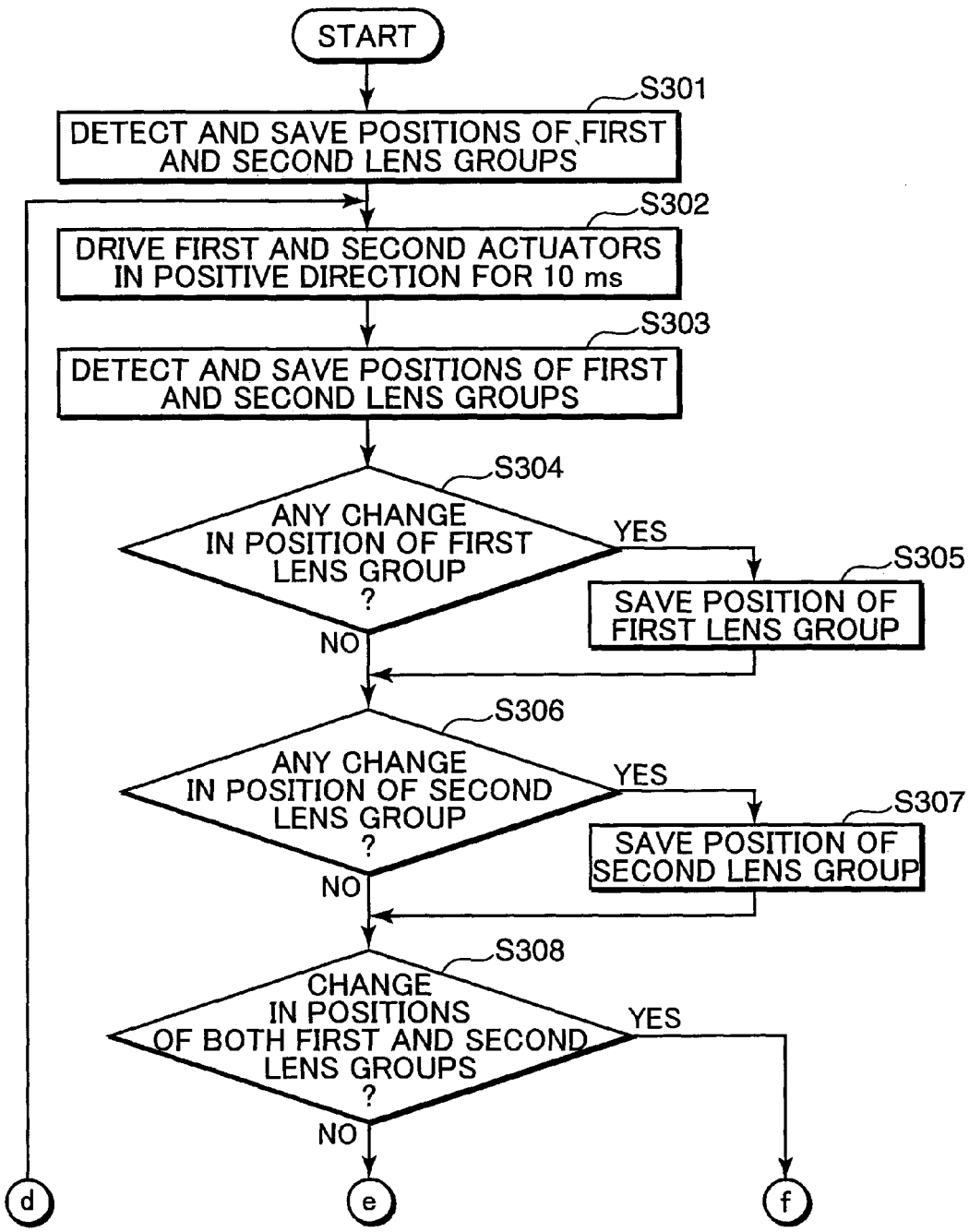
FIGS. 8 and 9 are a flowchart showing an initial checking processing for the driving mechanism shown in FIG. 7.
Figure 9:
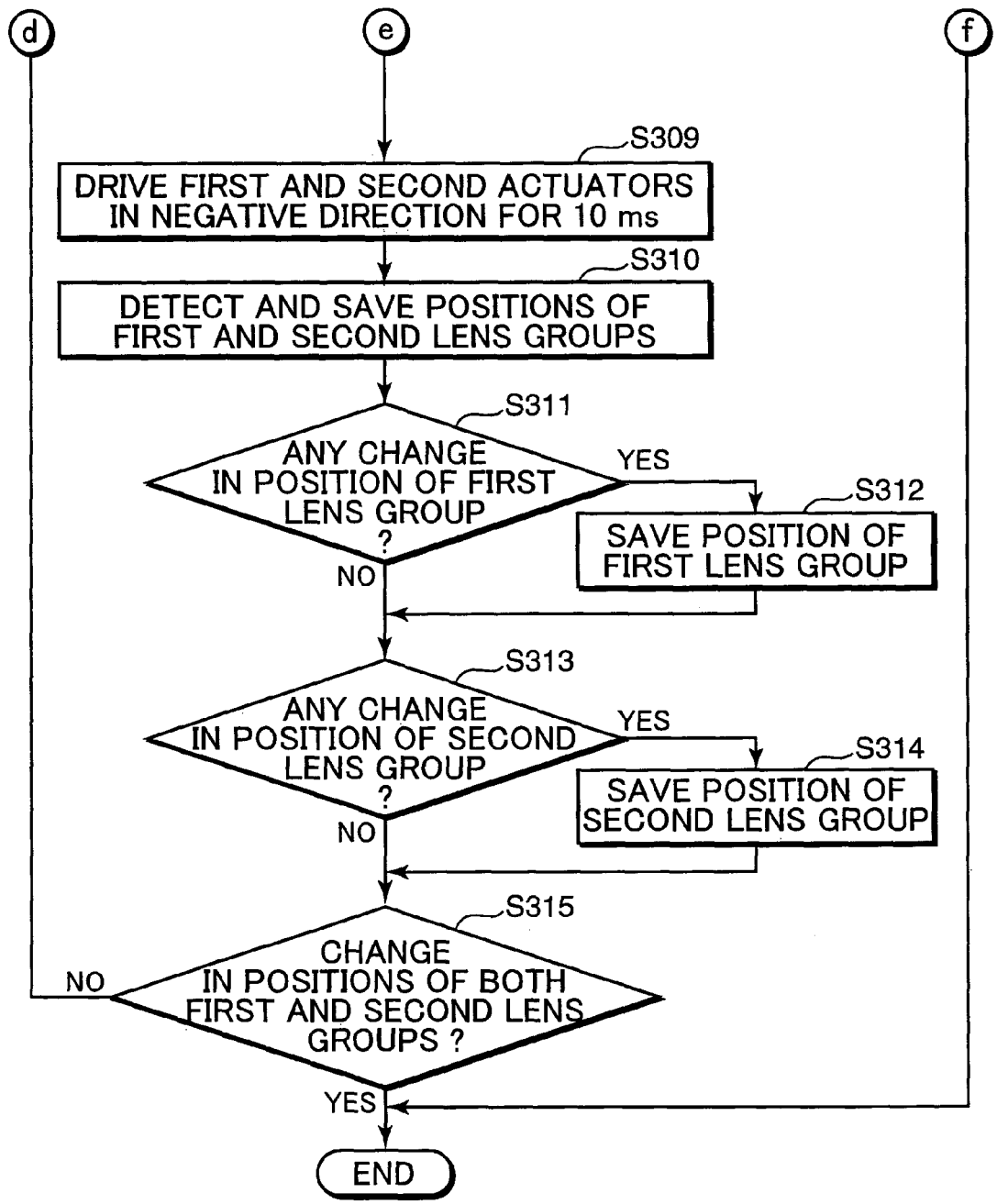

Referring to FIGS. 8 and 9 in which it should be noted that d, e, f in FIG. 8 correspond to d, e, f in FIG. 9, in Step S301, the first position detecting circuit 104 detects an initial position of the first lens group L1 and outputs the detected initial position to the control circuit 102. The control circuit 102 saves the initial position of the first lens group L1 received from the first position detecting circuit 104. Further, the second position detecting circuit 106 detects an initial position of the second lens group L2 and outputs the detected initial position to the control circuit 102. The control circuit 102 saves the initial position of the second lens group L2 received from the second position detecting circuit 106.

In Step S302, the control circuit 102 simultaneously drives the first and second actuators 10, 20 in positive direction for a specified period. Although the specified period during which the control circuit 102 simultaneously drives the first and second actuators 10, 20 in positive direction is 10 ms in this embodiment, the present invention is not limited thereto. For example, a suitable period obtained by an experiment on driving may be set.

In Step S303, the first position detecting circuit 104 detects the position of the first lens group L1 and outputs the detected position to the control circuit 102. The control circuit 102 saves the position of the first lens group L1 received from the first position detecting circuit 104. Further, the second position detecting circuit 106 detects the position of the second lens group L2 and outputs the detected position to the control circuit 102. The control circuit 102 saves the position of the second lens group L2 received from the second position detecting circuit 106.

In Step S304, the control circuit 102 compares the position of the first lens group L1 after the actuators 10, 20 were driven and the initial position thereof and judges whether the first lens group L1 has moved. Here, if the position of the first lens group L1 after the actuators 10, 20 were driven and the initial position thereof differ, i.e., if the position of the first lens group L1 has changed from the initial position (YES in Step S304), Step S305 follows. If these two positions coincide, i.e., if the position of the first lens group L1 has not changed from the initial position (NO in Step S304), Step S306 follows.

In Step S305, the control circuit 102 saves a change in the position of the first lens group L1. In other words, the control circuit 102 saves the position of the driven member 14 moved from the initial position after simultaneously driving the first and second actuators 10, 20 in positive direction for the specified period.

In Step S306, the control circuit 102 compares the position of the second lens group L2 after the actuators 10, 20 were driven and the initial position thereof and judges whether the second lens group L2 has moved. Here, if the position of the second lens group L2 after the actuators 10, 20 were driven and the initial position thereof differ, i.e., if the position of the second lens group L2 has changed from the initial position (YES in Step S306), Step S307 follows. If these two positions coincide, i.e., if the position of the second lens group L2 has not changed from the initial position (NO in Step S306), Step S308 follows.

In Step S307, the control circuit 102 saves a change in the position of the second lens group L2. In other words, the control circuit 102 saves the position of the driven member 24 moved from the initial position after simultaneously driving the first and second actuators 10, 20 in positive direction for the specified period.

In Step S308, the control circuit 102 judges whether both first and second lens groups L1 and L2 have moved. Here, if the positions of both first and second lens groups L1 and L2 have changed (YES in Step S308), this processing is completed since the first and second actuators 10, 20 both properly operate. If neither the position of the first lens group L1 nor that of the second lens group L2 has changed, if only the position of the first lens group L1 has changed without changing that of the second lens group L2 and if only the position of the second lens group L2 has changed without changing that of the first lens group L1 (NO in Step S308), Step S309 follows to drive the first and second actuators 10, 20 again.

In Step S309, the control circuit 102 simultaneously drives the first and second actuators 10, 20 in negative direction for a specified period. Although the specified period during which the control circuit 102 simultaneously drives the first and second actuators 10, 20 in negative direction is 10 ms in this embodiment, the present invention is not limited thereto. For example, a suitable period obtained by an experiment on driving may be set.

In Step S310, the position detecting circuit 104 detects the position of the first lens group L1 and outputs the detected position to the control circuit 102. The control circuit 102 saves the position of the first lens group L1 received from the first position detecting circuit 104. Further, the position detecting circuit 106 detects the position of the second lens group L2 and outputs the detected position to the control circuit 102. The control circuit 102 saves the position of the second lens group L2 received from the second position detecting circuit 106.

In Step S311, the control circuit 102 compares the position of the first lens group L1 after the actuators 10, 20 were driven in negative direction and the position of the first lens group L1 before the actuators 10, 20 were driven in negative direction (after driving in positive direction) and judges whether the first lens group L1 has moved. Here, if the positions of the first lens group L1 after and before the actuators 10, 20 were driven in negative direction differ, i.e., if the position of the first lens group L1 after the actuators 10, 20 were driven in negative direction has changed from the position thereof before the actuators 10, 20 were driven in negative direction (YES in Step S311), Step S312 follows. If these two positions coincide, i.e., if the position of the first lens group L1 after the actuators 10, 20 were driven in negative direction has not changed from the position thereof before the actuators 10, 20 were driven in negative direction (NO in Step S311), Step S313 follows.

In Step S312, the control circuit 102 saves a change in the position of the first lens group L1. In other words, the control circuit 102 saves the position of the driven member 14 moved from the position before the actuators 10, 20 were driven in negative direction after simultaneously driving the first and second actuators 10, 20 in negative direction for the specified period.

In Step S313, the control circuit 102 compares the position of the second lens group L2 after the actuators 10, 20 were driven in negative direction and the position of the second lens group L2 before the actuators 10, 20 were driven in negative direction (after driving in positive direction) and judges whether the second lens group L2 has moved. Here, if the positions of the second lens group L2 after and before the actuators 10, 20 were driven in negative direction differ, i.e., if the position of the second lens group L2 after the actuators 10, 20 were driven in negative direction has changed from the position thereof before the actuators 10, 20 were driven in negative direction (YES in Step S313), Step S314 follows. If these two positions coincide, i.e., if the position of the second lens group L2 after the actuators 10, 20 were driven in negative direction has not changed from the position thereof before the actuators 10, 20 were driven in negative direction (NO in Step S313), Step S315 follows.

In Step S314, the control circuit 102 saves a change in the position of the second lens group L2. In other words, the control circuit 102 saves the position of the driven member 24 moved from the initial position after simultaneously driving the first and second actuators 10, 20 in negative direction for the specified period.

In Step S315, the control circuit 102 judges whether both first and second lens groups L1 and L2 have moved. Here, if the positions of both first and second lens groups L1 and L2 have changed (YES in Step S315), this processing is completed since the first and second actuators 10, 20 both properly operate. If neither the position of the first lens group L1 nor that of the second lens group L2 has moved, if only the position of the first lens group L1 has changed without changing that of the second lens group L2 and if only the position of the second lens group L2 has changed without changing that of the first lens group L1 (NO in Step. S315), Step S302 follows to drive the first and second actuators 10, 20 again.

In this embodiment, if the judgment result is negative in Step S315, Step S302 follows to perform the operations in Step S302 and succeeding Steps again. However, if either one of the first actuator 10 for moving the first lens group L1 and the second actuator 20 for moving the second lens group L2 was properly driven in the first processing of Steps S302 to S315, only the actuator not having been properly driven may be driven without driving the actuator having been properly driven in the next processing of Steps S302 to S315.

Alternatively, in this embodiment, if at least one of the first actuator 10 for moving the first lens group L1 and the second actuator 20 for moving the second lens group L2 was not properly driven in the first processing of Steps S302 to S315, the first and second actuators 10, 20 may be driven at a higher drive torque in the next processing of Steps S302 to S315 than in the first processing.

In this way, in the lens driving mechanism, the first actuator 10 for moving the first lens group L1 and the second actuator 20 for moving the second lens group L2 are simultaneously driven to detect the positions of the first and second lens groups L1, L2. Here, if at least one of the first and second lens groups L1, L2 has not moved, the first and second actuators 10, 20 are repeatedly simultaneously driven until both first and second lens groups L1, L2 are judged to have moved. If both first and second lens groups L1, L2 are judged to have moved, the first and second actuators 10, 20 perform their original operations.

Accordingly, in the case that the driven member 14, 24 and the driving member 13, 23 are adhered to each other in the first actuator 10 in which the driven member 14 and the driving member 13 are held by the frictional engagement or in the second actuator 20 in which the driven member 24 and the driving member 23 are held by the frictional engagement, vibration during the driving of one actuator to the other is transmitted by simultaneously driving the first and second actuators 10, 20. Thus, the driven member 14 and the driving member 13 of the first actuator 10 or the driven member 24 and the driving member 23 of the second actuator 20 can be released from the adhered state by the transmitted vibration. Therefore, the first and second lens groups L1, L2 can be properly driven.

Next, a modification of the second embodiment is described. In the second embodiment, the vibration of one actuator is transmitted to the other actuator by simultaneously driving the first and second actuators 10, 20, thereby releasing the driven members and the driving members of the respective actuators from the adhered state. However, in the modification, the first and second actuators 10, 20 are successively driven to transmit the vibration of one actuator to the other actuator, thereby releasing the driven members and the driving members of the respective actuators from the adhered state.

No description is given on a driving controller of the modification since it differs from that of the second embodiment only in the control algorithm. Only an initial checking processing different from that of the second embodiment is described here.

Figure 10:
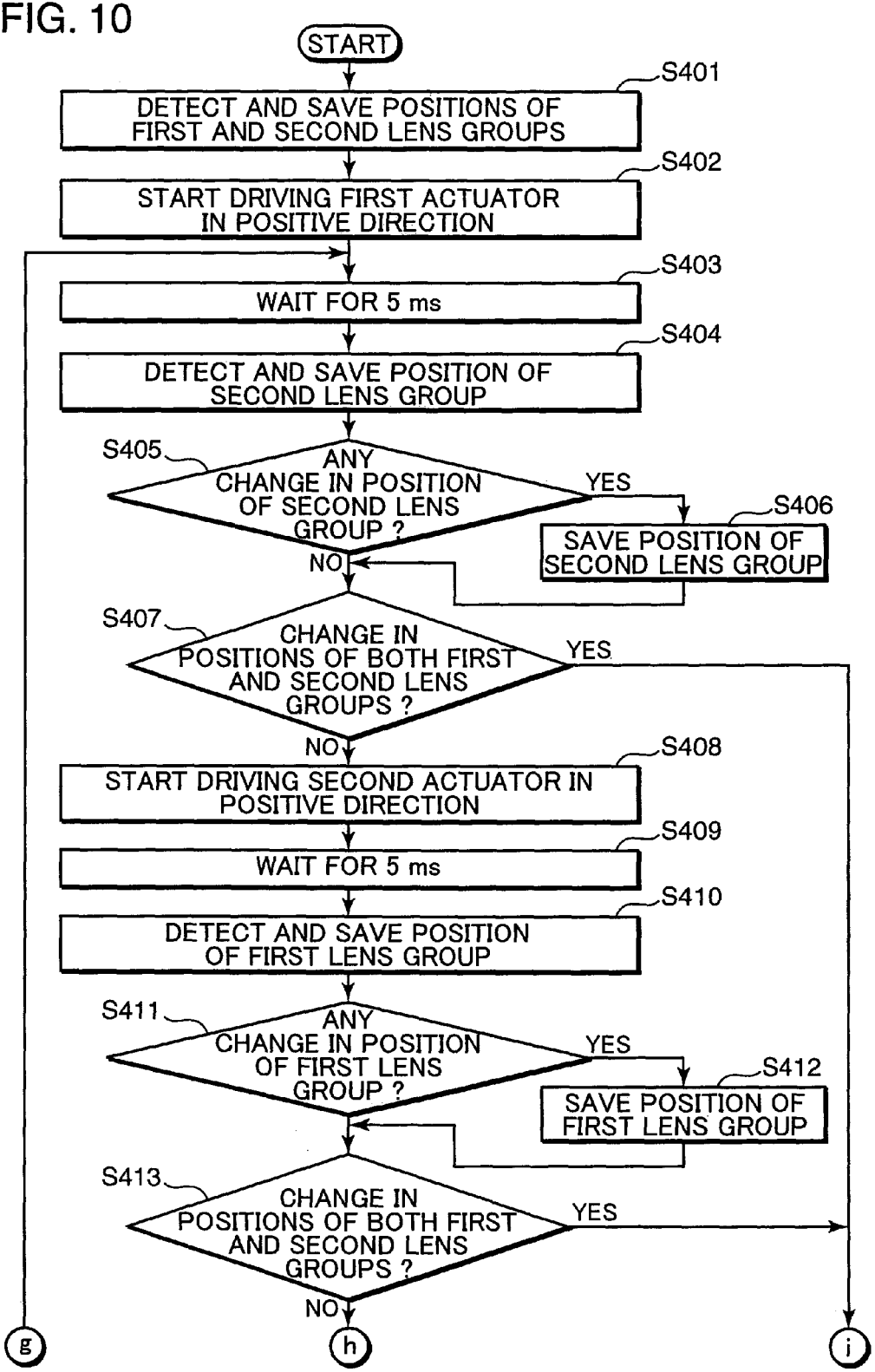
FIGS. 10 and 11 are a flowchart showing a modified initial checking processing for the driving mechanism shown in FIG. 7.
Figure 11:
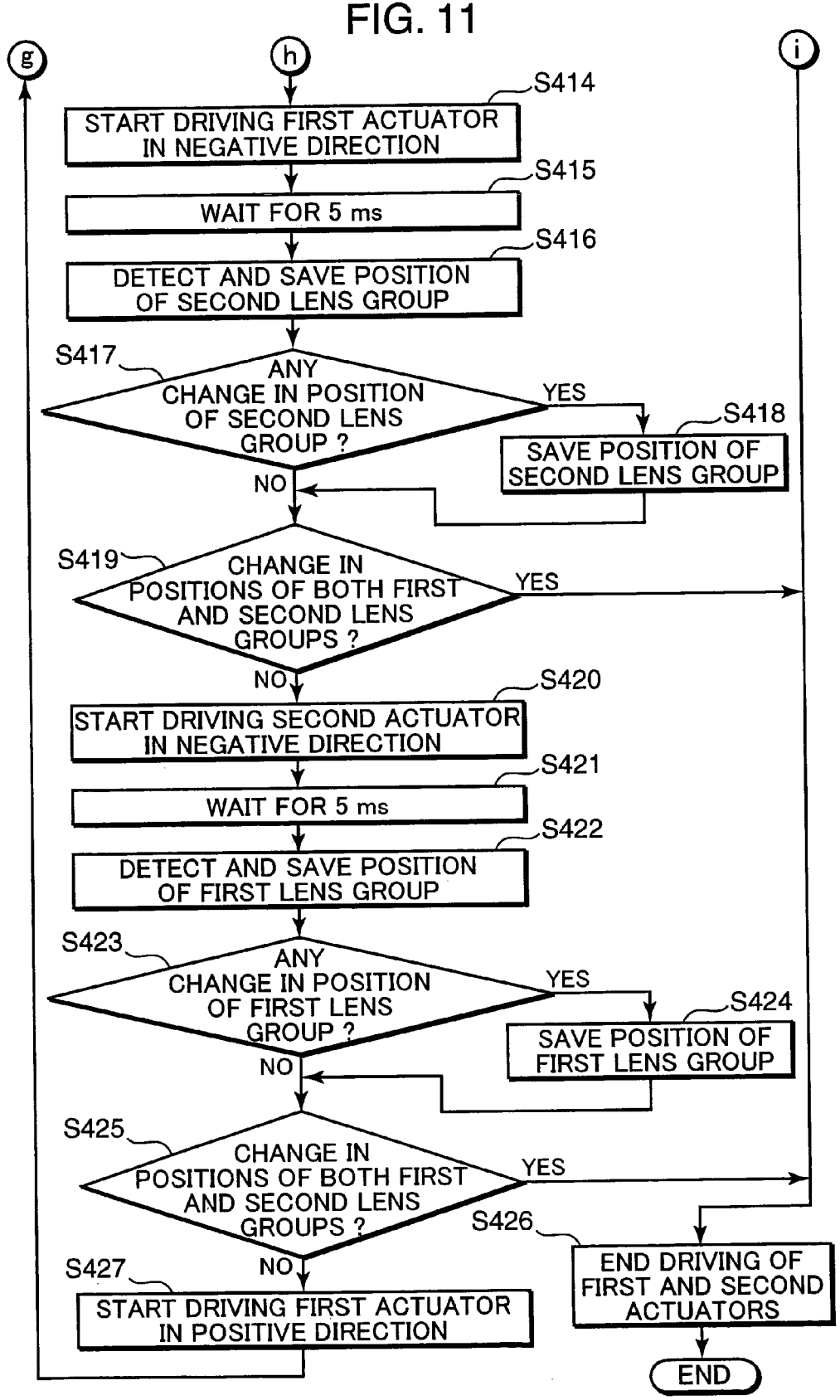

FIGS. 10 and 11 are a flowchart showing an initial checking processing according to the modification. It should be noted that g, h, i, in FIG. 10 correspond to g, h, i in FIG. 11.

In Step S401, the first position detecting circuit 104 detects an initial position of the first lens group L1 and outputs the detected initial position to the control circuit 102. The control circuit 102 saves the initial position of the first lens group L1 received from the first position detecting circuit 104. Further, the second position detecting circuit 106 detects an initial position of the second lens group L2 and outputs the detected initial position to the control circuit 102. The control circuit 102 saves the initial position of the second lens group L2 received from the second position detecting circuit 106.

In Step S402, the control circuit 102 starts driving the first actuator 10 in positive direction.

After the lapse of a specified period following the start of driving the first actuator 10 in positive direction (Step S403), the second position detecting circuit 106 detects a position of the second lens group L2 and outputs the detected initial position to the control circuit 102 in Step S404. The control circuit 102 saves the initial position of the second lens group L2 received from the second position detecting circuit 106. Although the specified period lasting until the second position detecting circuit 106 detects the position of the second lens group L2 after the control circuit 102 started driving the first actuator 10 in positive direction is 5 ms in this modification, the present invention is not limited thereto. For example, a suitable period obtained by an experiment on driving may be set.

In Step S405, the control circuit 102 compares the position of the second lens group L2 after the first actuator 10 was driven and the initial position thereof and judges whether the second lens group L2 has moved. Here, if the position of the second lens group L2 after the first actuator 10 was driven and the initial position thereof differ, i.e., if the position of the second lens group L2 has changed from the initial position (YES in Step S405), Step S406 follows. If these two positions coincide, i.e., if the position of the second lens group L2 has not changed from the initial position (NO in Step S405), Step S407 follows. It should be noted that the second lens group L2 does not move when the initial checking processing is performed at first since the second actuator 20 is not driven and, therefore, the judgment result in Step S405 is negative.

In Step S406, the control circuit 102 saves a change in the position of the second lens group L2. In other words, the control circuit 102 saves the position of the driven member 24 moved from the initial position in the case that the position of the second lens group L2 has changed.

In Step S407, the control circuit 102 judges whether both first and second lens groups L1 and L2 have moved. Here, if the positions of both first and second lens groups L1 and L2 have changed (YES in Step S407), Step S426 follows since the first and second actuators 10, 20 both properly operate. If neither the position of the first lens group L1 nor that of the second lens group L2 has changed, if only the position of the first lens group L1 has changed without changing that of the second lens group L2 and if only the position of the second lens group L2 has changed without changing that of the first lens group L1 (NO in Step S407), Step S408 follows to drive the second actuator 20 in positive direction. It should be noted that the second lens group L2 does not move when the initial checking processing is performed at first since the second actuator 20 is not driven and the first lens group L1 does not move, either, since the position of the first lens group L1 after the actuator 10 was driven is not detected and, therefore, the judgment result in Step S407 is negative.

In Step S408, the control circuit 102 starts driving the second actuator 20 in positive direction.

After the lapse of a specified period following the start of driving the second actuator 20 in positive direction (Step S409), the first position detecting circuit 104 detects a position of the first lens group L1 and outputs the detected position to the control circuit 102 in Step S410. The control circuit 102 saves the position of the first lens group L1 received from the first position detecting circuit 104. Although the specified period lasting until the first position detecting circuit 104 detects the position of the first lens group L1 after the control circuit 102 started driving the second actuator 20 in positive direction is 5 ms in this modification, the present invention is not particularly limited thereto. For example, a suitable period obtained by an experiment on driving may be set.

In Step S411, the control circuit 102 compares the position of the first lens group L1 after the actuator 20 was driven and the initial position thereof and judges whether the first lens group L1 has moved. Here, if the position of the first lens group L1 after the actuator 20 was driven and the initial position thereof differ, i.e., if the position of the first lens group L1 has changed from the initial position (YES in Step S411), Step S412 follows. If these two positions coincide, i.e., if the position of the first lens group L1 has not changed from the initial position (NO in Step S411), Step S413 follows.

In Step S412, the control circuit 102 saves a change in the position of the first lens group L1. In other words, the control circuit 102 saves the position of the driven member 14 moved from the initial position in the case that the position of the first lens group L1 has changed.

In Step S413, the control circuit 102 judges whether both first and second lens groups L1 and L2 have moved. Here, if the positions of both first and second lens groups L1 and L2 have changed (YES in Step S413), Step S426 follows since the first and second actuators 10, 20 both properly operate. If neither the position of the first lens group L1 or that of the second lens group L1 has changed, if only the position of the first lens group L1 has changed without changing that of the second lens group L2, and if only the position of the second lens group L2 has changed without changing that of the first lens group L1 (NO in Step S413), Step S414 follows to drive the first actuator 10 in negative direction.

In Step S414, the control circuit 102 starts driving the first actuator 10 in negative direction.

After the lapse of a specified period following the start of driving the first actuator 10 in negative direction (Step S415), the second position detecting circuit 106 detects a position of the second lens group L2 and outputs the detected position to the control circuit 102 in Step S416. The control circuit 102 saves the position of the second lens group L2 received from the second position detecting circuit 106. Although the specified period lasting until the second position detecting circuit 106 detects the position of the second lens group L2 after the control circuit 102 started driving the first actuator 20 in negative direction is 5 ms in this modification, the present invention is not particularly limited thereto. For example, a suitable period obtained by an experiment on driving may be set.

In Step S417, the control circuit 102 compares the position of the second lens group L2 after the first actuator 10 was driven and the initial position thereof and judges whether the second lens group L2 has moved. Here, if the position of the second lens group L2 after the first actuator 10 was driven and the initial position thereof differ, i.e., if the position of the second lens group L2 has changed from the initial position (YES in Step S417), Step S418 follows. If these two positions coincide, i.e., if the position of the second lens group L2 has not changed from the initial position (NO in Step S417), Step S419 follows.

In Step S418, the control circuit 102 saves a change in the position of the second lens group L2. In other words, the control circuit 102 saves the position of the driven member 24 moved from the initial position in the case that the position of the second lens group L2 has changed.

In Step S419, the control circuit 102 judges whether both first and second lens groups L1 and L2 have moved. Here, if the positions of both first and second lens groups L1 and L2 have changed (YES in Step S419), Step S426 follows since the first and second actuators 10, 20 both properly operate. If neither the position of the first lens group L1 nor that of the second lens group L2 has changed, if only the position of the first lens group L1 has changed without changing that of the second lens group L2 and if only the position of the second lens group L2 has changed without changing that of the first lens group L1 (NO in Step S419), Step S420 follows to drive the second actuator 20 in negative direction.

In Step S420, the control circuit 102 starts driving the second actuator 20 in negative direction.

After the lapse of a specified period following the start of driving the second actuator 20 in negative direction (Step S421), the first position detecting circuit 104 detects a position of the first lens group L1 and outputs the detected position to the control circuit 102 in Step S422. The control circuit 102 saves the position of the first lens group L1 received from the first position detecting circuit 104. Although the specified period lasting until the first position detecting circuit 104 detects the position of the first lens group L1 after the control circuit 102 started driving the second actuator 20 in negative direction is 5 ms in this modification, the present invention is not limited thereto. For example, a suitable period obtained by an experiment on driving may be set.

In Step S423, the control circuit 102 compares the position of the first lens group L1 after the second actuator 20 was driven and the initial position thereof and judges whether the first lens group L1 has moved. Here, if the position of the first lens group L1 after the second actuator 20 was driven and the initial position thereof differ, i.e., if the position of the first lens group L1 has changed from the initial position (YES in Step S423), Step S424 follows. If these two positions coincide, i.e., if the position of the first lens group L1 has not changed from the initial position (NO in Step S423), Step S425 follows.

In Step S424, the control circuit 102 saves a change in the position of the first lens group L1. In other words, the control circuit 102 saves the position of the driven member 14 moved from the initial position in the case that the position of the first lens group L1 has changed.

In Step S425, the control circuit 102 judges whether both first and second lens groups L1 and L2 have moved. Here, if the positions of both first and second lens groups L1 and L2 have changed (YES in Step S425), Step S426 follows since the first and second actuators 10, 20 both properly operate. If neither the position of the first lens group L1 nor that of the second lens group L2 has changed, if only the position of the first lens group L1 has changed without changing that of the second lens group L2 and if only the position of the second lens group L2 has changed without changing that of the first lens group L1 (NO in Step S425), Step S427 follows to drive the first actuator 10 in positive direction.

In Step S426, the control circuit 102 stops driving the first and second actuators 10, 20 since the first and second actuators 10, 20 both properly operate, thereby completing the initial checking processing.

In Step S427, the control circuit 102 starts driving the first actuator 10 in positive direction and proceeds to Step S403 to perform the operations in Steps S403 and succeeding Steps.

In this modification, if either one of the first actuator 10 for moving the first lens group L1 and the second actuator 20 for moving the second lens group L2 was not properly driven in the first processing of Steps S402 to S425, the first and second actuators 10, 20 may be driven at a higher drive torque in the next processing of Steps S403 to S425 than in the first processing.

In this way, in the lens driving mechanism, the first actuator 10 for moving the first lens group L1 and the second actuator 20 for moving the second lens group L2 are successively driven to detect the positions of the first and second lens groups L1, L2. Here, if at least one of the first and second lens groups L1, L2 has not moved, the first and second actuators 10, 20 are repeatedly successively driven until both first and second lens groups L1, L2 are judged to have moved. If both first and second lens groups L1, L2 are judged to have moved, the first and second actuators 10, 20 perform their original operations.

Accordingly, in the case that the driven member 14, 24 and the driving member 13, 23 are adhered to each other in the first actuator 10 in which the driven member 14 and the driving member 13 are held by the frictional engagement or in the second actuator 20 in which the driven member 24 and the driving member 23 are held by the frictional engagement, vibration during the driving of one actuator to the other is transmitted by successively driving the first and second actuators 10, 20. Thus, the driven member 14 and the driving member 13 of the first actuator 10 or the driven member 24 and driving member 23 of the second actuator 20 can be released from the adhered state by the transmitted vibration. Therefore, the first and second lens groups L1, L2 can be properly driven.

Next will be described a third embodiment of the present invention relating to a lens driving mechanism for a small-size image sensing apparatus used in an electronic camera incorporated in a mobile or portable gear, a mobile phone or the like.

Figure 12:
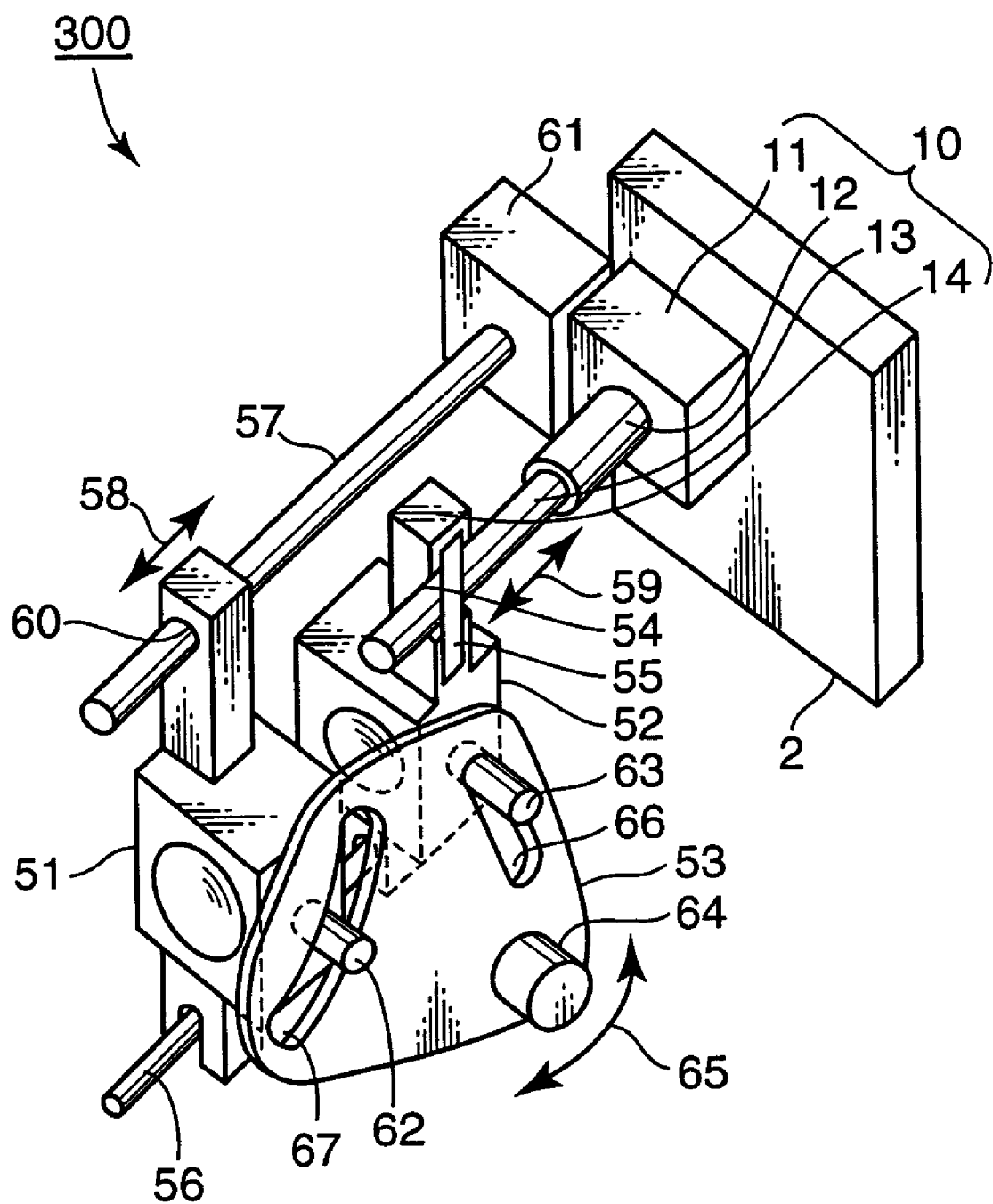
FIG. 12 is a diagram showing a driving mechanism of an image sensing apparatus according to a third embodiment of the invention.

Referring to FIG. 12 showing a lens driving mechanism for driving a zoom lens of a small-size image sensing apparatus used in an electronic camera for a mo2bile or portable gear, a mobile phone or the like. In this lens driving mechanism, a front and a rear lens frames 51, 52 guided along optical-axis direction are coupled by a plate cam 53, and only the rear lens frame 52 is driven by an actuator 10.

The actuator 10 for driving the rear lens frame 52 is of friction-drive type and includes a supporting member 11, a piezoelectric element 12, a driving member 13, and a driven member 14. The piezoelectric element 12 is arranged such that the elongating/shrinking directions thereof are aligned with optical-axis direction and has one end thereof with respect to the elongating/shrinking directions secured to the supporting member 11 while having the other end thereof secured to an end of a shaft of the driving member 13. The driving member 13 is arranged along optical-axis direction and biased in a groove 54 formed in the driven member 14 by a leaf spring 55, thereby being frictionally coupled to the driven member 14. The driven member 14 is integrally formed with the lens frame 52.

The front lens frame 51 is so supported as to be movable in parallel with optical-axis direction as indicated by arrows 58 by a common guiding shaft 56 and an exclusive guiding shaft 57 arranged along optical-axis direction. The common guiding shaft 56 is also engaged with the rear lens frame 52 and supports it while guiding it along optical-axis direction as indicated by arrows 59. The exclusive guiding shaft 57 is introduced through a guide hole 60 formed in the front lens frame 51 and has one end thereof secured to a base 61.

The respective lens frames 51, 52 are provided with cam pins 62, 63 projecting in parallel in a direction normal to optical-axis direction.

The plate cam 53 is arranged adjacent to the lens frames 51, 52 and in parallel with an optical axis, and rotatably supported as indicated by arrows 65 by a supporting shaft 64 parallel with the cam pins 62, 63. The plate cam 53 is formed with cam grooves 66, 67, through which the cam pins 63, 62 are respectively inserted to be engaged. In this way, the front and rear lens frames 51, 52 are cam-coupled to move together. An image sensing device 2 for photoelectrically converting an object image and outputting image signals is arranged on a focusing surface of an optical system including groups of lenses held in the front and rear lens frames 51, 52.

Next, the operation of the driving mechanism 300 is described. The driving member 13 is vibrated along its longitudinal direction by applying a voltage of a suitable waveform (e.g., serrated waveform, a rectangular waveform of a specified duty ratio, or the like) to the piezoelectric element 12, whereby the lens frame 52 is driven in optical-axis direction along the driving member 13.

For example, a drive voltage of a suitable serrated pulse waveform is applied to the piezoelectric element 12 to reciprocally move the driving member 13 along optical-axis direction at different speeds depending on the moving direction thereof. Thus, when the driving member 13 is relatively slowly moved, the lens frame 52 (driven member 14) is moved together with the driving member 13 by a frictional force acting between the lens frame 52 and the driving member 13. On the other hand, when the driving member 13 is relatively quickly moved in reverse direction, a slip occurs between the driving member 13 and the lens frame 52 (driven member 14), and only the driving member 13 is moved while the lens frame 52 (driven member 14) remain stationary. In this way, the lens frame 52 (driven member 14) can be moved in optical-axis direction along the driving member 13.

Since the front and lens frames 51, 52 are coupled by the plate cam 53 and moved together when the lens frame 52 is moved along optical-axis direction by the actuator 10, the front lens frame 51 is moved along optical-axis direction while keeping a specified relationship to the lens frame 52. Specifically, when the lens frame 52 is driven by the actuator 10, the movement thereof is transmitted to the front lens frame 51 coupled thereto by the plate cam 53, and the mutual positional relationship of the respective front and lens frames 51, 52 is uniquely determined by the shapes of the cam grooves 66, 67 of the plate cam 53. Therefore, the lens frames 51, 52 can be so controlled as to move while keeping a specified relationship by suitably setting the shapes of the cam grooves 66, 67 of the plate cam 53.

It should be noted that an LED for detecting the position of the lens frame 52 is provided at a specified position of the lens frame 52, and a PSD is provided in a main body at such a position where it receives a spot light emitted from the LED.

Figure 13:
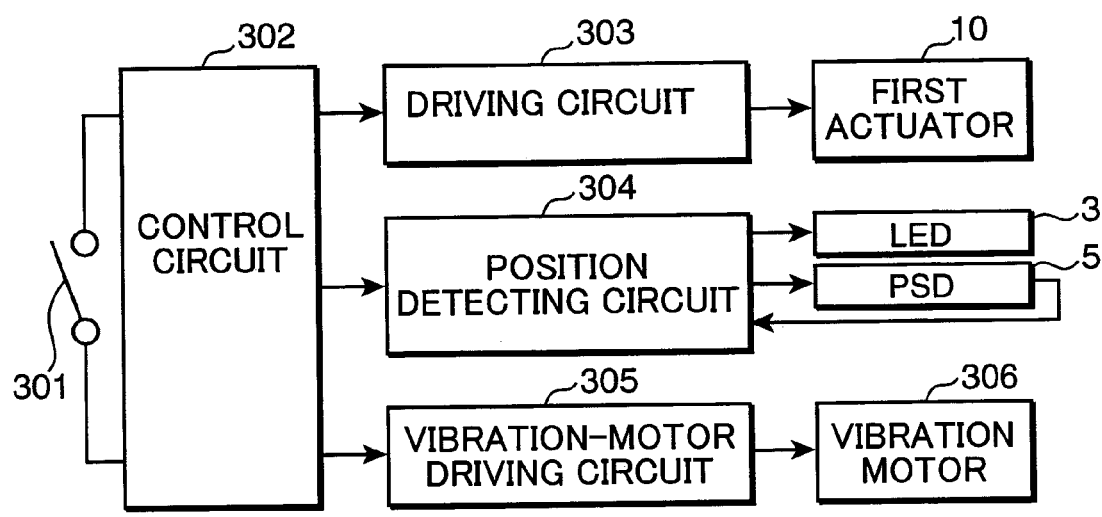
FIG. 13 is a block diagram showing a construction of a driving controller for the driving mechanism shown in FIG. 12.

Referring to FIG. 13 showing a construction of a driving controller of the driving mechanism 300, the driving mechanism 300 is comprised of a main switch 301, a control circuit 302, a driving circuit 303, the actuator 10, a position detecting circuit 304, an LED 3, a PSD 5, a vibration-motor driving circuit 305 and a vibration motor 306. The control circuit 302, the driving circuit 303, the position detecting circuit 304, the LED 3, the PSD 5, and the vibration-motor driving circuit 305 constitute a driving controller for this driving mechanism 300.

The main switch 301 is used to turn a power supply on and off. The control circuit 302 is comprised of a CPU, a ROM, and a RAM. The ROM is adapted to store a control program for controlling the operation of the CPU of the control circuit 302, and the RAM is adapted to temporarily save various data in calculation processing and control processing. The control circuit 302 is connected with the main switch 301, the driving circuit 303, the position detecting circuit 304, and the vibration-motor driving circuit 305, and controllably drives the actuator 10 and the vibration motor 306 in accordance with an output signal from the position detecting circuit 304.

The driving circuit 303 is connected with the piezoelectric element 12 of the actuator 10, and causes the driving member 13 to elongate and shrink by applying a specified drive voltage to the piezoelectric element 12, thereby driving the driven member 14.

The position detecting circuit 304 causes the LED 3 to emit light, and has a light current corresponding to a light-receiving position on a light-receiving surface of the PSD 5 inputted thereto to detect the position of the lens frame 52. The position detecting circuit 304 detects the position of the driven member 14 of the actuator 10 by detecting the position of the lens frame 52.

The vibration-motor driving circuit 305 drives the vibration motor 306 provided as a vibration function of a mobile phone or the like, and outputs a specified drive signal to the vibration motor 306. The vibration motor 306 vibrates itself to a specified degree, for example, by rotating a weight.

No description is given on the entire processing of this embodiment since it is the same as the entire processing shown in FIG. 3, and only an initial checking processing in Step S2 is described.

Figure 14:
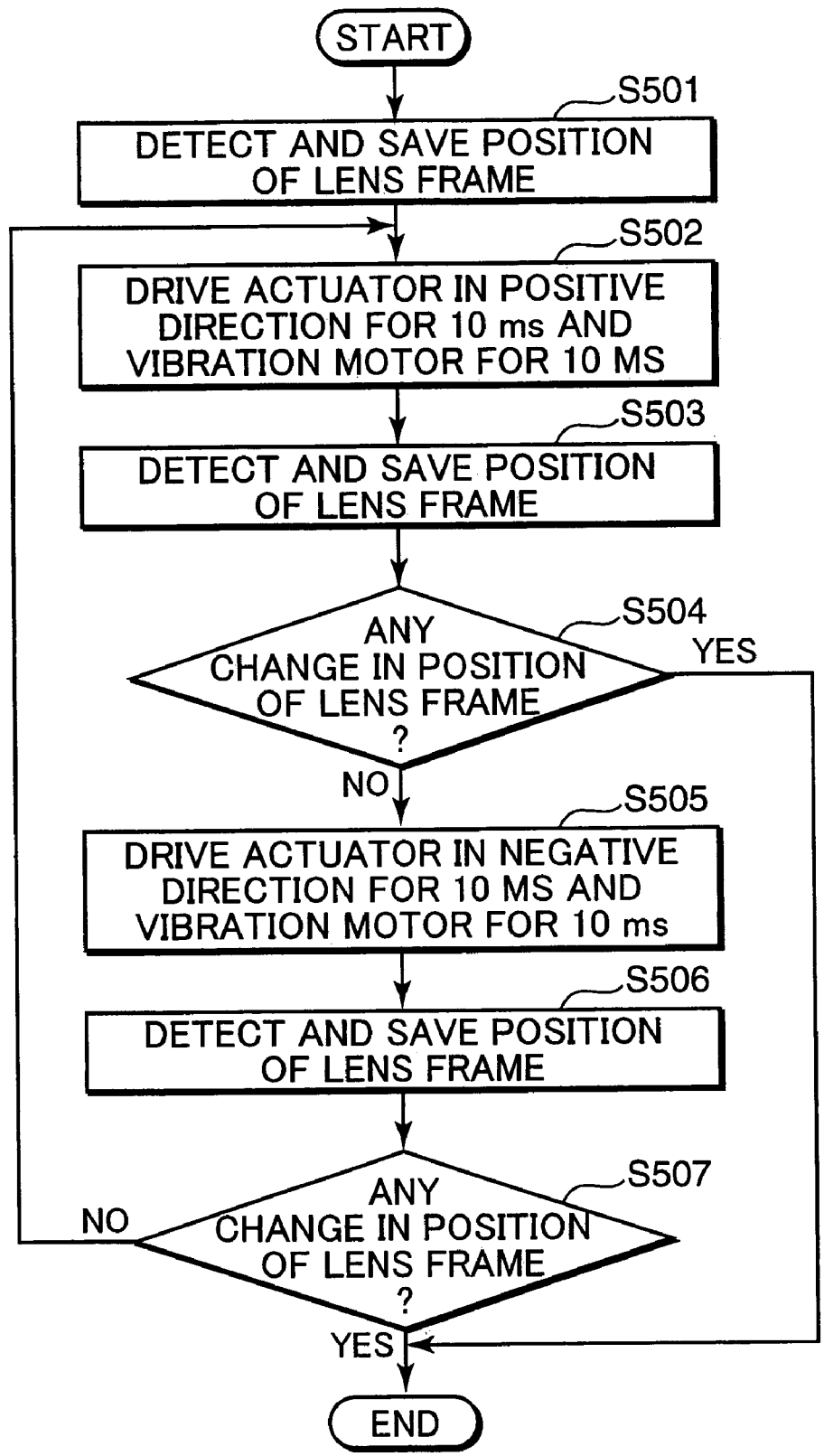
FIG. 14 is a flowchart showing an initial checking processing for the driving mechanism shown in FIG. 12.

Referring to FIG. 14, in Step S501, the position detecting circuit 304 detects an initial position of the lens frame 52 and outputs the detected initial position to the control circuit 302. The control circuit 302 saves the initial position of the lens frame 52 received from the position detecting circuit 304.

In Step S502, the control circuit 302 drives the actuator 10 in positive direction for a specified period and drives the vibration motor 306 for the same period as the driving period of the actuator 10. Although the specified period during which the control circuit 302 simultaneously drives the actuator 10 and the vibration motor 306 is 10 ms in this embodiment, the present invention is not limited thereto. For example, a suitable period obtained by an experiment on driving may be set.

In Step S503, the position detecting circuit 304 detects the position of the lens frame 52 and outputs the detected position to the control circuit 302. The control circuit 302 saves the position of the lens frame 52 received from the position detecting circuit 304.

In Step S504, the control circuit 302 compares the position of the lens frame 52 after the actuator 10 and the vibration motor 306 were driven and the initial position thereof and judges whether the lens frame 52 has moved. Here, if the position of the lens frame 52 after the actuator 10 and the vibration motor 306 were driven and the initial position thereof differ, i.e., if the position of the lens frame 52 has changed from the initial position (YES in Step S504), this processing is completed since the actuator 10 properly operates. If these two positions coincide, i.e., if the position of the lens frame 52 has not changed from the initial position (NO in Step S504), Step S505 follows.

In Step S505, the control circuit 302 drives the actuator 10 in negative direction for a specified period and drives the vibration motor 306 for the same period as the driving period of the actuator 10. Although the specified period during which the control circuit 302 simultaneously drives the actuator 10 and the vibration motor 306 is 10 ms in this embodiment, the present invention is not particularly limited thereto. For example, a suitable period obtained by an experiment on driving may be set.

In Step S506, the position detecting circuit 304 detects the position of the lens frame 52 and outputs the detected position to the control circuit 302. The control circuit 302 saves the position of the lens frame 52 received from the position detecting circuit 304.

In Step S507, the control circuit 302 compares the position of the lens frame 52 after the actuator 10 and the vibration motor 306 were driven and the initial position thereof and judges whether the lens frame 52 has moved. Here, if the position of the lens frame 52 after the actuator 10 and the vibration motor 306 were driven and the initial position thereof differ, i.e., if the position of the lens frame 52 has changed from the initial position (YES in Step S507), this processing is completed since the actuator. 10 properly operates. If these two positions coincide, i.e., if the position of the lens frame 52 has not changed from the initial position (NO in Step S507), Step S502 follows to simultaneously drive the actuator 10 and the vibration motor 306 and perform the operations in Step S502 and succeeding Steps.

In this embodiment, if the actuator 10 for moving the lens frame 52 was not properly driven in the first processing of Steps S502 to S507, the actuator 10 may be driven at a higher drive torque in the next processing of Steps S502 to S507 than in the first processing.

In this way, the position of the lens frame 52 is detected by simultaneously driving the actuator 10 for driving the lens frame 52 of the lens driving mechanism of the electronic camera for the mobile or portable gear and the vibration motor 306 provided as a vibration function. Here, the actuator 10 and the vibration motor 306 are simultaneously driven again unless the position of the lens frame 52 has changed, and repeatedly simultaneously driven until the lens frame 52 is judged to have moved. Further, if the lens frame 52 is judged to have moved, the actuator 10 performs its original operation.

Accordingly, in the case that the driven member 14 and the driving member 13 are adhered to each other in the actuator 10 in which the driven member 14 and the driving member 13 are held by the frictional engagement, vibration during the driving of the vibration motor 360 is transmitted to the actuator 10 by simultaneously driving the actuator 10 and the vibration motor 306. Thus, the driven member 14 and the driving member 13 of the actuator 10 can be released from the adhered state by the transmitted vibration. Therefore, the lens frame 52 can be properly driven.

Next, a modification of the third embodiment is described. In the third embodiment, the vibration of the vibration motor 306 is transmitted to the actuator 10 by simultaneously driving the actuator 10 and the vibration motor 306, thereby releasing the driven member and the driving member of the actuator 10 from the adhered state. However, in the modification of the third embodiment, the actuator 10 and the vibration motor 306 are successively driven to transmit the vibration of the vibration motor 306 to the actuator 10, thereby releasing the driven member and the driving member of the actuator 10 from the adhered state.

No description is given on a drive control of this modification since it differs only in the control algorithm of a control circuit. Only an initial checking processing different from that of the third embodiment is described here.

Figure 15:
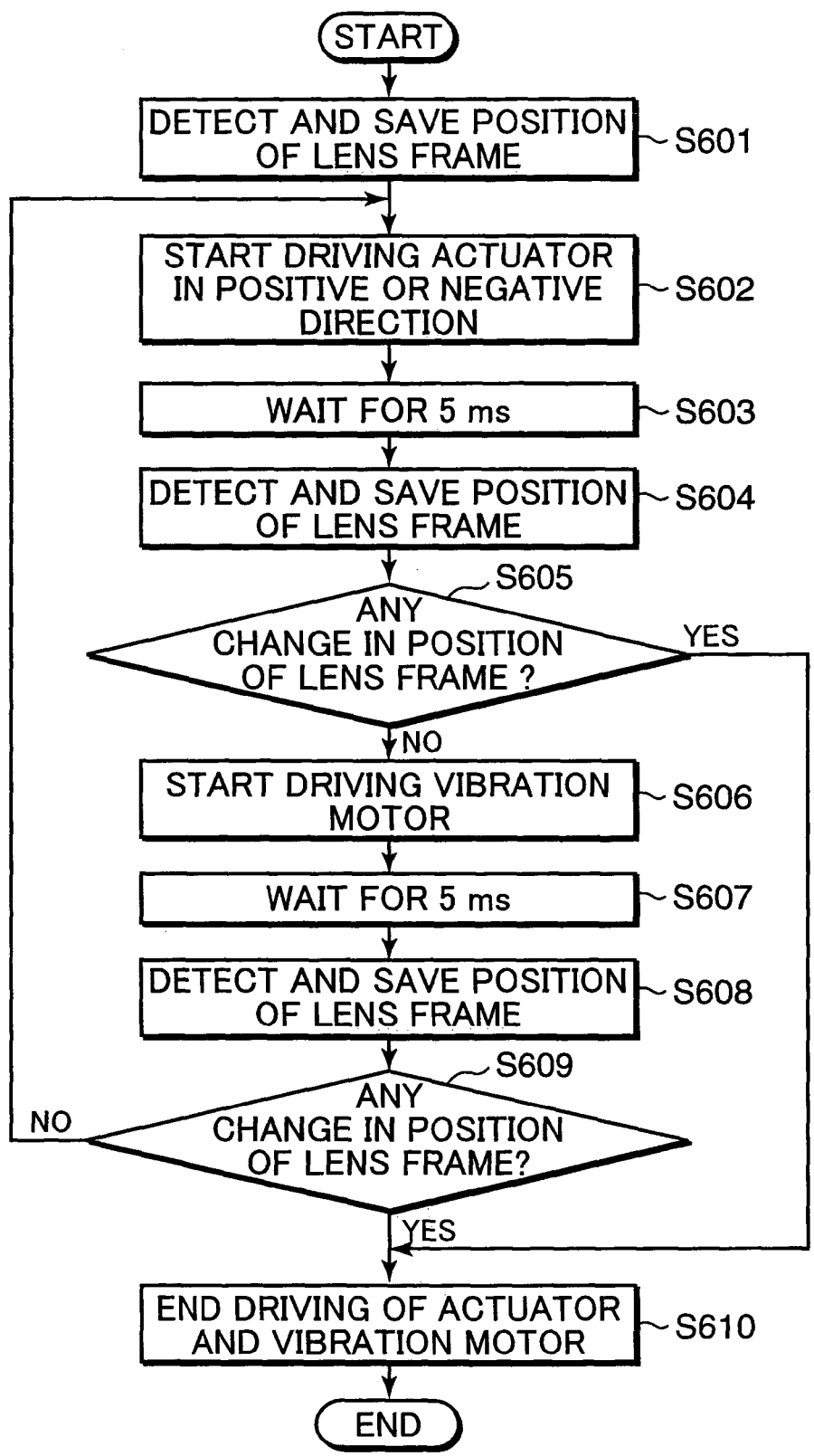
FIG. 15 is a flowchart showing a modified initial checking processing for the driving mechanism shown in FIG. 12.

Referring to FIG. 15, in Step S601, the position detecting circuit 304 detects an initial position of the lens frame 52 and outputs the detected initial position to the control circuit 302. The control circuit 302 saves the initial position of the lens frame 52 received from the position detecting circuit 304.

In Step S602, the control circuit 302 starts driving the actuator 10 in positive or negative direction.

After the lapse of a specified period following the start of driving the actuator 10 (Step S603), the position detecting circuit 304 detects the position of the lens frame 52 and outputs the detected position to the control circuit 302 in Step S604. The control circuit 302 saves the position of the lens frame 52 received from the position detecting circuit 304. Although the specified period lasting until the position detecting circuit 304 detects the position of the lens frame 52 after the control circuit 302 started driving the actuator 10 in positive or negative direction is 5 ms in this modification, the present invention is not limited thereto. For example, a suitable period obtained by an experiment on driving may be set.

In Step S605, the control circuit 302 compares the position of the lens frame 52 after the actuator 10 was driven and the initial position thereof and judges whether the lens frame 52 has moved. Here, if the position of the lens frame 52 after the actuator 10 was driven and the initial position thereof differ, i.e., if the position of the lens frame 52 has changed from the initial position (YES in Step S605), Step S610 follows since the actuator 10 properly operates. If these two positions coincide, i.e., if the position of the lens frame 52 has not changed from the initial position (NO in Step S605), Step S606 follows.

In Step S606, the control circuit 302 starts driving the vibration motor 306.

After the lapse of a specified period following the start of driving the vibration motor 306 (Step S607), the position detecting circuit 304 detects the position of the lens frame 52 and outputs the detected position to the control circuit 302 in Step S608. The control circuit 302 saves the position of the lens frame 52 received from the position detecting circuit 304. Although the specified period lasting until the position detecting circuit 304 detects the position of the lens frame 52 after the control circuit 302 started driving the vibration motor 306 is 5 ms in this modification, the present invention is not limited thereto. For example, a suitable period obtained by an experiment on driving may be set.

In Step S609, the control circuit 302 compares the position of the lens frame 52 after the vibration motor 306 was driven and the initial position thereof and judges whether the lens frame 52 has moved. Here, if the position of the lens frame 52 after the vibration motor 306 was driven and the initial position thereof differ, i.e., if the position of the lens frame 52 has changed from the initial position (YES in Step S609), Step S610 follows since the actuator 10 properly operates. If these two positions coincide, i.e., if the position of the lens frame 52 has not changed from the initial position (NO in Step S609), S602 follows and the operations in Step S602 and succeeding Steps are performed.

In Step S602, the control circuit 302 starts driving the actuator 10 in negative direction if the actuator 10 was driven in positive direction last time while starting driving the actuator 10 in positive direction if the actuator 10 was driven in negative direction last time. In other words, the control circuit 302 drives the vibration motor 306 after driving the actuator 10 in negative direction in the case that the actuator 10 cannot be released from the adhered state even if the vibration motor 306 is driven after the actuator 10 is driven in positive direction.

In Step S610, the control circuit 302 stops driving the actuator 10 and the vibration motor 306 since the actuator 10 properly operates, thereby completing the initial checking processing.

In this modification, if the actuator 10 for moving the lens frame 52 was not properly driven in the first processing of Steps S602 to S609, the actuator 10 may be driven at a higher drive torque in the next processing of Steps S602 to S609 than in the first processing.

In this way, the actuator 10 for driving the lens frame 52 in the lens driving mechanism of the electronic camera for mobile or portable gear and the vibration motor 306 provided as a vibration function are successively driven to detect the position of the lens frame 52. Here, if the lens frame 52 has not moved, the actuator 10 and the vibration motor 306 are successively driven again and repeatedly successively driven until the lens frame 52 is judged to have moved. If the lens frame 52 is judged to have moved, the actuator 10 performs its original operation.

Accordingly, in the case that the driven member 14 and the driving member 13 are adhered to each other in the actuator 10 in which the driven member 14 and the driving member 13 are held by the frictional engagement, vibration during the driving of the vibration motor 306 is transmitted to the actuator 10 by simultaneously driving the actuator 10 and the vibration motor 306. Thus, the driven member 14 and the driving member 13 of the actuator 10 can be released from the adhered state by the transmitted vibration. Therefore, the lens frame 52 can be properly driven.

Next, a fourth embodiment of the present invention is described. In this embodiment, an actuator in which a driven member and a driving member are held by a frictional engagement is applied to a lens driving mechanism for a focusing lens of an image sensing apparatus.

Figure 16:
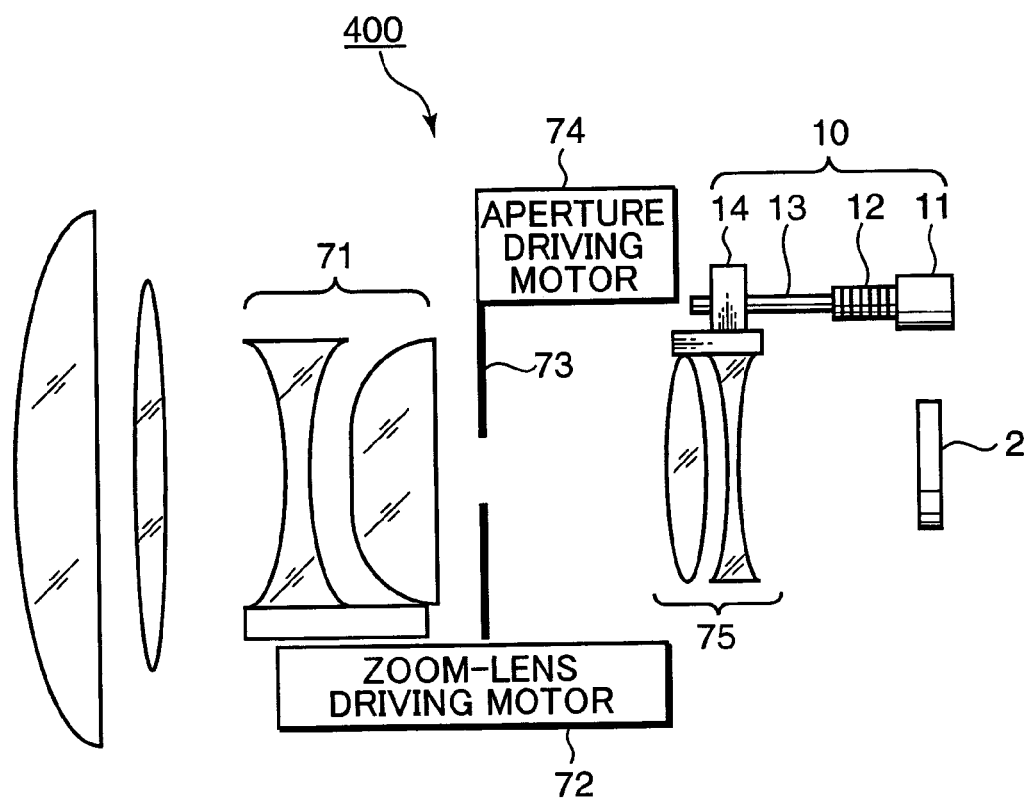
FIG. 16 is a diagram showing a driving mechanism of an image sensing apparatus according to a fourth embodiment of the invention.

Referring to FIG. 16 showing a drive mechanism of the fourth embodiment, a lens driving mechanism 400 includes a zoom lens group 71 for changing the focal length, a zoom-lens driving motor 72 for driving the zoom lens group 71 along an optical-axis direction, an aperture 73 for adjusting an amount of light, an aperture driving motor 74 for driving the aperture 73, a focusing lens group 75 for attaining a focusing condition and an actuator 10 for driving the focusing lens group 75 in optical-axis direction.

The actuator 10 for driving the focusing lens group 75 is of friction-drive type and includes a supporting member 11, a piezoelectric element 12, a driving member 13 and a driven member 14. The piezoelectric element 12 is arranged such that the elongating/shrinking directions thereof are aligned with optical-axis direction and has one end thereof with respect to the elongating/shrinking directions secured to the supporting member 11 while having the other end thereof secured to an end of a shaft of the driving member 13. The driving member 13 is arranged along optical-axis direction and frictionally coupled to the driven member 14. The driven member 14 is connected with the focusing lens group 75, which is moved along optical-axis direction as the driven member 14 is moved along optical-axis direction. An image sensing device 2 for photoelectrically converting an object image and outputting image signals is arranged on focusing surfaces of the zoom lens group 71 and the focusing lens group 75.

Next, the operation of the driving mechanism 400 is described. The driving member 13 is vibrated along its longitudinal direction by applying a voltage of a suitable waveform (e.g., serrated waveform, a rectangular waveform of a specified duty ratio, or the like) to the piezoelectric element 12, whereby the focusing lens group 75 is driven in optical-axis direction along the driving member 13.

For example, a drive voltage of a suitable serrated pulse waveform is applied to the piezoelectric element 12 to reciprocally move the driving member 13 along optical-axis direction at different speeds depending on the moving direction thereof. Thus, when the driving member 13 is relatively slowly moved, the focusing lens group 75 (driven member 14) is moved together with the driving member 13 by a frictional force acting between the focusing lens group 75 and the driving member 13. On the other hand, when the driving member 13 is relatively quickly moved in reverse direction, a slip occurs between the driving member 13 and the focusing lens group 75 (driven member 14), and only the driving member 13 is moved while the focusing lens group 75 (driven member 14) remains stationary. In this way, the focusing lens group 75 (driven member 14) can be moved in optical-axis direction along the driving member 13.

It should be noted that an LED for detecting the position of the focusing lens group 75 is provided at a specified position of the focusing lens group 75, and a PSD is provided in a main body at such a position where it receives a spot light emitted from the LED.

Figure 17:
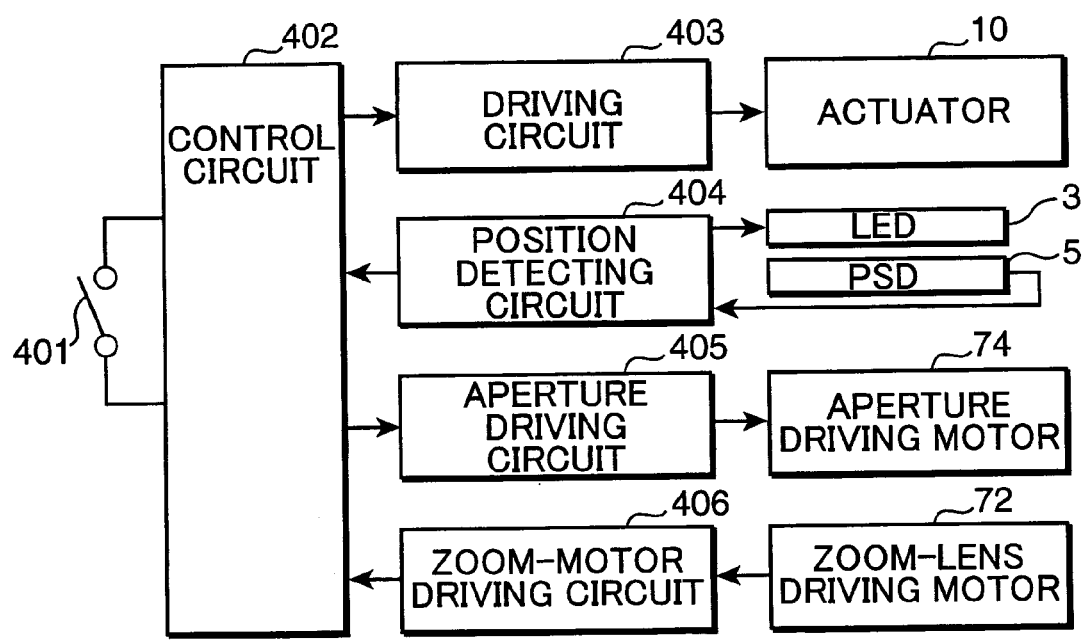
FIG. 17 is a block diagram showing a construction of a driving controller for the driving mechanism shown in FIG. 16.

FIG. 17 is a block diagram showing a construction of a driving controller of the fourth embodiment. The driving controller includes a control circuit 402, a driving circuit 403 for driving the actuator 10, a position detecting circuit 404, an LED 3, a PSD 5, an aperture driving circuit 405 for driving the aperture driving motor 74, a zoom-motor driving circuit 406 for driving the zoom-lens driving motor 72.

A main switch 401 is used to turn a power supply on and off. The control circuit 402 is comprised of a CPU, a ROM, and a RAM. The ROM is adapted to store a control program for controlling the operation of the CPU of the control circuit 402, and the RAM is adapted to temporarily save various data in calculation processing and control processing. The control circuit 402 is connected with the main switch 401, the driving circuit 403, the position detecting circuit 404, the aperture driving circuit 405 and the zoom-motor driving circuit 406, and controllably drives the actuator 10, the aperture driving motor 74 and the zoom-lens driving motor 72 in accordance with an output signal from the position detecting circuit 404.

The driving circuit 403 is connected with the piezoelectric element 12 of the actuator 10, and causes the driving member 13 to elongate and shrink by applying a specified drive voltage to the piezoelectric element 12, thereby driving the driven member 14.

The position detecting circuit 404 causes the LED 3 to emit light, and has a light current corresponding to a light-receiving position on a light-receiving surface of the PSD 5 inputted thereto to detect the position of the focusing lens group 75. The position detecting circuit 404 detects the position of the driven member 14 of the actuator 10 by detecting the position of the focusing lens group 75.

The aperture driving circuit 405 drives the aperture driving motor 74 and outputs a specified drive signal to the aperture driving motor 74. The aperture driving motor 74 adjusts an amount of light incident on the light receiving surface of the image sensing device 2 in accordance with the drive signal outputted from the aperture driving circuit 405.

The zoom-motor driving circuit 406 drives the zoom-motor driving motor 72 and outputs a specified drive signal to the zoom-lens driving motor 72. The zoom-lens driving motor 72 changes the focal length by moving the focusing lens group 75 along optical-axis direction in accordance with the drive signal outputted from the zoom-motor driving circuit 406.

No description is given on the entire processing of this embodiment since it is the same as the entire processing shown in FIG. 3, and only an initial checking processing in Step S2 is described.

Figure 18:
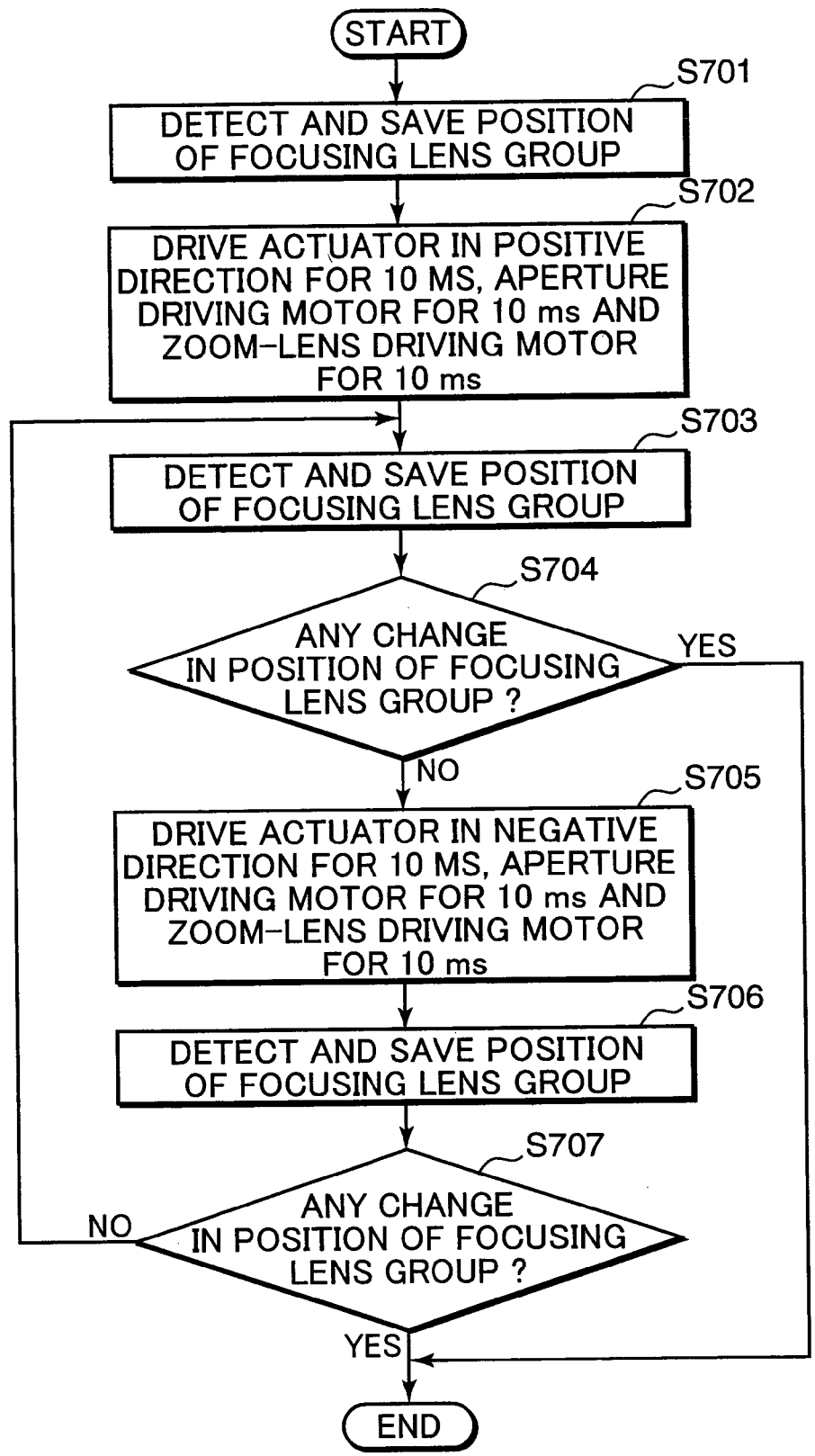
FIG. 18 is a flowchart showing an initial checking processing for the driving mechanism shown in FIG. 16.

Referring to FIG. 18 showing the initial checking processing, in Step S701, the position detecting circuit 404 detects an initial position of the focusing lens group 75 and outputs the detected initial position to the control circuit 402. The control circuit 402 saves the initial position of the focusing lens group 75 received from the position detecting circuit 404.

In Step S702, the control circuit 402 drives the actuator 10 in positive direction for a specified period and drives the aperture driving motor 74 and the zoom-lens driving motor 72 for the same period as the driving period of the actuator 10. Although the specified period during which the control circuit 402 simultaneously drives the actuator 10, the aperture driving motor 74 and the zoom-lens driving motor 72 is 10 ms in this embodiment, the present invention is not limited thereto. For example, a suitable period obtained by an experiment on driving may be set.

In Step S703, the position detecting circuit 404 detects the position of the focusing lens group 75 and outputs the detected position to the control circuit 402. The control circuit 402 saves the position of the focusing lens group 75 received from the position detecting circuit 404.

In Step S704, the control circuit 402 compares the position of the focusing lens group 75 after the actuator 10, the aperture driving motor 74 and the zoom-lens driving motor 72 were driven and the initial position thereof and judges whether the focusing lens group 75 has moved. Here, if the position of the focusing lens group 75 after the actuator 10, the aperture driving motor 74 and the zoom-lens driving motor 72 were driven and the initial position thereof differ, i.e., if the position of the focusing lens group 75 has changed from the initial position (YES in Step S704), this processing is completed since the actuator 10 properly operates. If these two positions coincide, i.e., if the position of the focusing lens group 75 has not changed from the initial position (NO in Step S704), Step S705 follows.

In Step S705, the control circuit 402 drives the actuator 10 in negative direction for a specified period and drives the aperture driving motor 74 and the zoom-lens driving motor 72 for the same period as the driving period of the actuator 10. Although the specified period during which the control circuit 402 simultaneously drives the actuator 10, the aperture driving motor 74 and the zoom-lens driving motor 72 is 10 ms in this embodiment, the present invention is not limited thereto. For example, a suitable period obtained by an experiment on driving may be set.

In Step S706, the position detecting circuit 404 detects the position of the focusing lens group 75 and outputs the detected position to the control circuit 402. The control circuit 402 saves the position of the focusing lens group 75 received from the position detecting circuit 404.

In Step S707, the control circuit 402 compares the position of the focusing lens group 75 after the actuator 10, the aperture driving motor 74 and the zoom-lens driving motor 72 were driven and the initial position thereof and judges whether the focusing lens group 75 has moved. Here, if the position of the focusing lens group 75 after the actuator 10, the aperture driving motor 74 and the zoom-lens driving motor 72 were driven and the initial position thereof differ, i.e., if the position of the focusing lens group 75 has changed from the initial position (YES in Step S707), this processing is completed since the actuator 10 properly operates. If these two positions coincide, i.e., if the position of the focusing lens group 75 has not changed from the initial position (NO in Step S707), Step S702 follows to simultaneously drive the actuator 10, the aperture driving motor 74 and the zoom-lens driving motor 72 and perform the operations in Step S702 and succeeding Steps.

Although the actuator 10, the aperture driving motor 74 and the zoom-lens driving motor 72 are simultaneously driven in this embodiment, the present invention is not limited thereto. The actuator 10 and the aperture driving motor 74 may be simultaneously driven without driving the zoom-lens driving motor 72 or the actuator 10 and the zoom-lens driving motor 72 may be simultaneously driven without driving the aperture driving motor 74.

Further, the actuator 10 and the aperture driving motor 74 may be simultaneously driven in Step S702 of FIG. 18, and the actuator 10 and the zoom-lens driving motor 72 may be simultaneously driven in Step S705. In other words, in the case that the driving member 13 and the driven member 14 are not released from the adhered state even if the actuator 10 and the aperture driving motor 74 are simultaneously driven, vibration different from that of the aperture driving motor 74 is given to the actuator 10 by simultaneously driving the actuator 10 and the zoom-lens driving motor 72 different from the aperture driving motor 74, whereby the driving member 13 and the driven member 14 can be released from the adhered state.

In this embodiment, if the actuator 10 for moving the focusing lens group 75 was not properly driven in the first processing of Steps S702 to S707, the actuator 10 may be driven at a higher drive torque in the next processing of Steps S702 to S707 than in the first processing.

In this way, in the driving mechanism 400 in which the actuator 10 including the driven member 14 and the driving member 13 held by a frictional engagement is applied to the lens driving mechanism for the focusing lens, the actuator 10 for driving the focusing lens group 75, the aperture driving motor 74 for driving the aperture 73, and the zoom-lens driving motor 72 for driving the zoom lens group 71 are simultaneously driven to detect the position of the focusing lens group 75. Here, if the focusing lens group 75 has not moved, the actuator 10, the aperture driving motor 74 and the zoom-lens driving motor 72 are simultaneously driven again and repeatedly simultaneously driven until the focusing lens group 75 is judged to have moved. If the focusing lens group 75 is judged to have moved, the actuator 10 performs its original operation.

Accordingly, in the case that the driven member 14 and the driving member 13 are adhered to each other in the actuator 10 in which the driven member 14 and the driving member 13 are held by the frictional engagement, vibrations during the driving of the aperture driving motor 74 and the zoom-lens driving motor 72 are transmitted to the actuator 10 by simultaneously driving the actuator 10, the aperture driving motor 74 and the zoom-lens driving motor 72. Thus, the driven member 14 and the driving member 13 of the actuator 10 can be released from the adhered state by the transmitted vibrations. Therefore, the focusing lens group 75 can be properly driven.

Next, a modification of the fourth embodiment is described. In the fourth embodiment, the vibrations of the aperture driving motor 74 and the zoom-lens driving motor 72 are transmitted to the actuator 10 by simultaneously driving the actuator 10, the aperture driving motor 74 and the zoom-lens driving motor 72, thereby releasing the driven member 14 and the driving member 13 of the actuator 10 from the adhered state. However, in the modification of the fourth embodiment, the actuator 10, the aperture driving motor 74 and the zoom-lens driving motor 72 are successively driven to transmit the vibrations of the aperture driving motor 74 and the zoom-lens driving motor 72 to the actuator 10, thereby releasing the driven member 14 and the driving member 13 of the actuator 10 from the adhered state.

No description is given on a driving controller of the modification of the fourth embodiment since it differs only in the control algorithm of the driving controller. Only an initial checking processing different from that of the fourth embodiment is described here.

Figure 19:
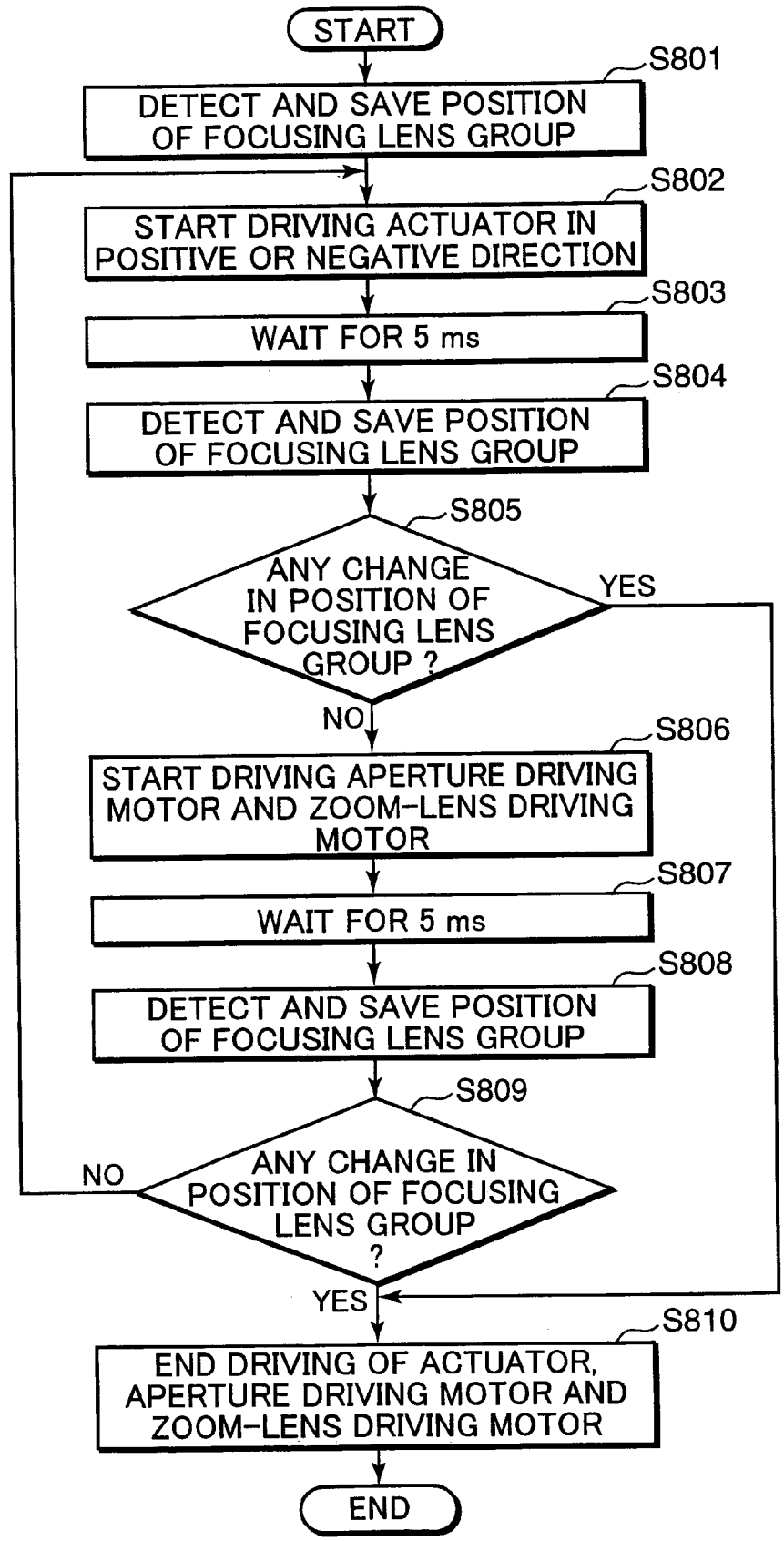
FIG. 19 is a flowchart showing a modified initial checking processing for the driving mechanism shown in FIG. 16.

Referring to FIG. 19, in Step S801, the position detecting circuit 404 detects an initial position of the focusing lens group 75 and outputs the detected initial position to the control circuit 402. The control circuit 402 saves the initial position of the focusing lens group 75 received from the position detecting circuit 404.

In Step S802, the control circuit 402 starts driving the actuator 10 in positive or negative direction.

After the lapse of a specified period following the start of driving the actuator 10 in positive or negative direction (Step S803), the position detecting circuit 404 detects a position of the focusing lens group 75 and outputs the detected position to the control circuit 402 in Step S804. The control circuit 402 saves the position of the focusing lens group 75 received from the position detecting circuit 404. Although the specified period lasting until the position detecting circuit 404 detects the position of the focusing lens group 75 after the control circuit 402 started driving the actuator 10 in positive or negative direction is 5 ms in this modification, the present invention is not limited thereto. For example, a suitable period obtained by an experiment on driving may be set.

In Step S805, the control circuit 402 compares the position of the focusing lens group 75 after the actuator 10 was driven and the initial position thereof and judges whether the focusing lens group 75 has moved. Here, if the position of the focusing lens group 75 after the actuator 10 was driven and the initial position thereof differ, i.e., if the position of the focusing lens group 75 has changed from the initial position (YES in Step S805), Step S810 follows since the actuator 10 properly operates. If these two positions coincide, i.e., if the position of the focusing lens group 75 has not changed from the initial position (NO in Step S805), Step S806 follows.

In Step S806, the control circuit 402 starts driving the aperture driving motor 74 and the zoom-lens driving motor 72.

After the lapse of a specified period following the start of driving the aperture driving motor 74 and the zoom-lens driving motor 72 (Step S807), the position detecting circuit 404 detects the position of the focusing lens group 75 and outputs the detected position to the control circuit 402 in Step S808. The control circuit 402 saves the position of the focusing lens group 75 received from the position detecting circuit 404. Although the specified period lasting until the position detecting circuit 404 detects the position of the focusing lens group 75 after the control circuit 402 started driving the aperture driving motor 74 and the zoom-lens driving motor 72 is 5 ms in this modification, the present invention is not limited thereto. For example, a suitable period obtained by an experiment on driving may be set.

In Step S809, the control circuit 402 compares the position of the focusing lens group 75 after the aperture driving motor 74 and the zoom-lens driving motor 72 were driven and the initial position thereof and judges whether the focusing lens group 75 has moved. Here, if the position of the focusing lens group 75 after the aperture driving motor 74 and the zoom-lens driving motor 72 were driven and the initial position thereof differ, i.e., if the position of the focusing lens group 75 has changed from the initial position (YES in Step S809), Step S810 follows since the actuator 10 properly operates. If these two positions coincide, i.e., if the position of the focusing lens group 75 has not changed from the initial position (NO in Step S809), Steps S802 follows and the operations in Step S802 and succeeding Steps are performed.

In Step S802, the control circuit 402 starts driving the actuator 10 in negative direction if the actuator 10 was driven in positive direction last time while starting driving the actuator 10 in positive direction if the actuator 10 was driven in negative direction last time. In other words, the control circuit 402 drives the aperture driving motor 74 and the zoom-lens driving motor 72 after driving the actuator 10 in negative direction in the case that the actuator 10 cannot be released from the adhered state even if the aperture driving motor 74 and the zoom-lens driving motor 72 are driven after the actuator 10 is driven in positive direction.

In Step S810, the control circuit 402 stops driving the actuator 10, the aperture driving motor 74 and the zoom-lens driving motor 72 since the actuator 10 properly operates, thereby completing the initial checking processing.

In this modification, the actuator 10, the aperture driving motor 74 and the zoom-lens driving motor 72 are successively driven unless the driven member 14 is confirmed to have been driven by the position detecting circuit 404. However, the present invention is not limited thereto. The actuator 10 and the aperture driving motor 74 may be successively driven unless the driven member 14 is confirmed to have been driven by the position detecting circuit 404, and the actuator 10 and the zoom-lens driving motor 72 may be successively driven unless the driven member 14 is confirmed yet to have been driven by the position detecting circuit 404. In other words, in the case that the driving member 13 and the driven member 14 are not released from the adhered state even if the actuator 10 and the aperture driving motor 74 are simultaneously driven, vibration different from that of the aperture driving motor 74 is given to the actuator 10 by successively driving the actuator 10 and the zoom-lens driving motor 72 different from the aperture driving motor 74, whereby the driving member 13 and the driven member 14 can be released from the adhered state.

Further, in this embodiment, if the actuator 10 for moving the focusing lens group 75 was not properly driven in the first processing of Steps S802 to S809, the actuator 10 may be driven at a higher drive torque in the next processing of Steps S802 to S809 than in the first processing.

In this way, in the electronic device 400 in which the actuator 10 including the driven member 14 and the driving member held by the frictional engagement is applied to the lens driving mechanism for the focusing lens, the actuator 10 for driving the focusing lens group 75, the aperture driving motor 74 for driving the aperture 73 and the zoom-lens driving motor 72 for driving the zoom lens group 71 are successively driven to detect the position of the focusing lens group 75. Here, if the focusing lens group 75 has not moved, the actuator 10, the aperture driving motor 74 and the zoom-lens driving motor 72 are successively driven again and repeatedly successively driven until the focusing lens group 75 is judged to have moved. If the focusing lens group 75 is judged to have moved, the actuator 10 performs its original operation.

Accordingly, in the case that the driven member 14 and the driving member 13 are adhered to each other in the actuator 10 in which the driven member 14 and the driving member 13 are held by the frictional engagement, vibrations during the driving of the aperture driving motor 74 and the zoom-lens driving motor 72 are transmitted to the actuator 10 by successively driving the actuator 10, aperture driving motor 74 and the zoom-lens driving motor 72. Thus, the driven member 14 and the driving member 13 of the actuator 10 can be released from the adhered state by the transmitted vibrations. Therefore, the focusing lens group 75 can be properly driven.

Next will be described a fifth embodiment of the present invention relating to a multiple-degree-of-freedom driving mechanism including a plurality of actuators in each of which a driven member and a driving member are held by a frictional engagement.

Figure 20:
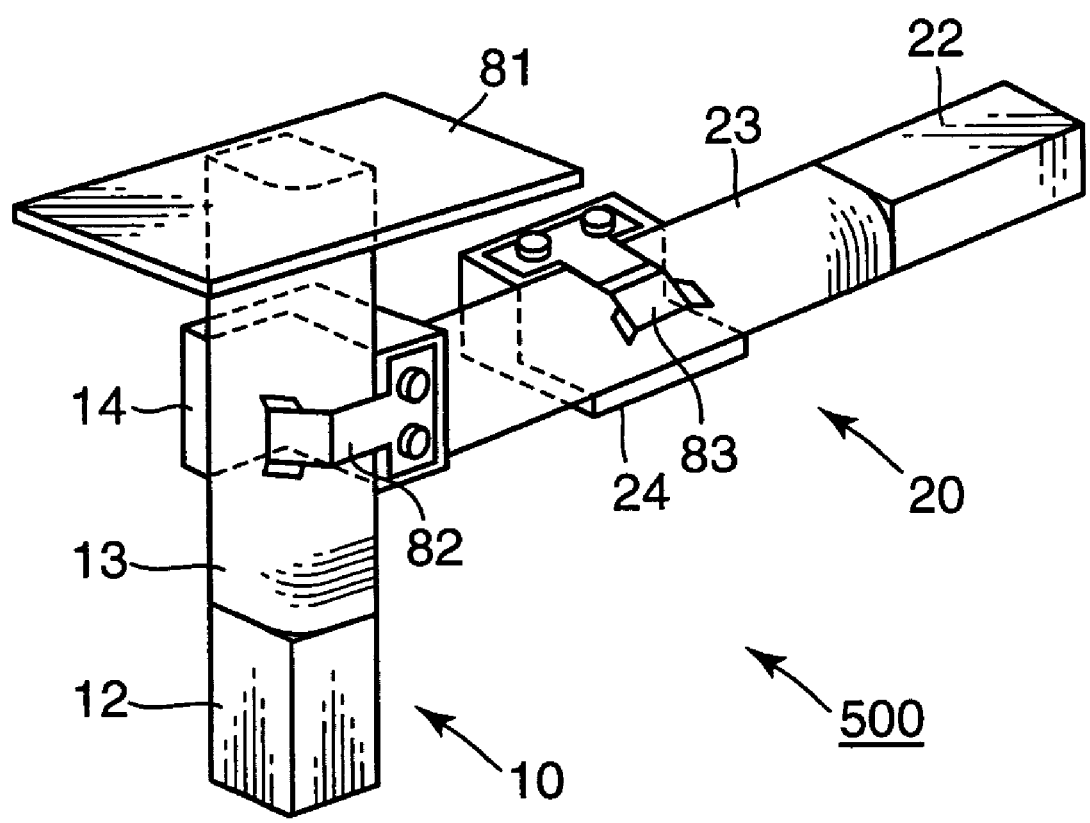
FIG. 20 is a diagram showing a driving mechanism of an image sensing apparatus according to a fifth embodiment of the invention.

Referring to FIG. 20, a multiple-degree-of-freedom driving mechanism 500 is used in an image sensing apparatus, and is comprised of a first actuator 10 and a second actuator 20. The driving mechanism 500 shown in FIG. 20 is a two-degree-of-freedom driving mechanism in which the first and second actuators 10, 20 are directly coupled.

The first actuator 10 is of friction-drive type, and includes a first piezoelectric element 12, a first driving member 13 and a first driven member 14. The second actuator 20 is also of friction-drive type, and includes a second piezoelectric element 22, a second driving member 23 and a second driven member 24. The base end of the first driving member 13 of the first actuator 10 is fixedly attached to a fixing portion 81. The first piezoelectric element 12 is fixedly attached to the leading end of the first driving member 13. The L-shaped first driven member 14 is frictionally engaged with the first driving member 13 so as to be movable along the first driving member 13. In other words, the first driven member 14 is slidably pressed against two surfaces of the first driving member 13 by a biasing force of a screwed leaf spring 82, thereby being held in position.

The second actuator 20 constructed similar to the first actuator 10 is secured to one side surface of the first driven member 14 of the first actuator 10. Specifically, the base end of the second driving member 23 of the second actuator 20 is fixedly attached to the side surface of the first driven member 14, and the second piezoelectric element 22 is fixedly attached to the leading end of the second driving member 23. The L-shaped second driven member 24 is frictionally engaged with the second driving member 23 so as to be movable along the second driving member 23. In other words, the second driven member 24 is slidably pressed against two surfaces of the second driving member 23 by a biasing force of a screwed leaf spring 83, thereby being held in position.

Next, the operation of the driving mechanism 500 is described. In the first actuator 10, the driving member 13 is vibrated along its longitudinal direction by applying a voltage of a suitable waveform (e.g., serrated waveform, a rectangular waveform of a specified duty ratio, or the like) to the first piezoelectric element 12, whereby the first driven member 14 is driven along the driving member 13. Likewise, in the second actuator 20, the driving member 23 is vibrated along its longitudinal direction by applying a voltage of a suitable waveform (e.g., serrated waveform, a rectangular waveform of a specified duty ratio, or the like) to the second piezoelectric element 22, whereby the second driven member 24 is driven along the driving member 23. In this way, the first and second driven members 14, 24 can be independently driven by applying the suitable drive pulses to the first and second piezoelectric elements 12, 22, respectively.

For example, a drive voltage of a suitable serrated pulse waveform is applied to the first piezoelectric element 12 to reciprocally move the first driving member 13 at different speeds depending on the moving direction thereof. Thus, when the first driving member 13 is relatively slowly moved, the second actuator 20 (driven member 14) is moved together with the driving member 13 by a frictional force acting between the second actuator 20 and the driving member 13. On the other hand, when the driving member 13 is relatively quickly moved in reverse direction, a slip occurs between the driving member 13 and the second actuator 20, and only the driving member 13 is moved while the second actuator 20 remains stationary. In this way, the second actuator 20 (driven member 14) can be moved in optical-axis direction along the driving member 13.

Since the second driven member 24 of the second actuator 20 is moved in a direction different from the moving direction of the first driven member 14 of the first actuator 10, the second driven member 24 of the second actuator 20 can be moved with 7two degrees of freedom by driving the first and second actuators 10, 20.

In this embodiment, a driving mechanism having more degrees of freedom can be constructed by additionally mounting a third actuator having a construction similar to those of the first and second actuators 10, 20 on one side surface of the second driven member 24 of the second actuator 20.

It should be noted that a first LED for detecting the position of the first driven member 14 of the first actuator 10 is provided at a specified position of the second actuator 20, and a first PSD is provided in a device main body at such a position where it receives a spot light emitted from the first LED. Further, a second LED for detecting the position of the second driven member 24 of the second actuator 20 is provided at a specified position of a member or the third actuator provided on the side surface of the second driven member 24 of the second actuator 20, and a second PSD is provided in the device main body at such a position where it receives a spot light emitted from the second LED.

Since the construction of a driving controller of the fifth embodiment is the same as that of the first embodiment shown in FIG. 2, it is described with reference to FIG. 2.

A main switch 101 is used to turn a power supply on and off. A control circuit 102 is comprised of a CPU, and a ROM, and a RAM. The ROM is adapted to store a control program for controlling the operation of the CPU of the control circuit 102, and the RAM is adapted to temporarily save various data in calculation processing and control processing. The control circuit 102 is connected with the main switch 101, a first driving circuit 103, a first position detecting circuit 104, a second driving circuit 105 and a second position detecting circuit 106, and controllably drives the first and second actuators 10, 20 in accordance with output signals from the main switch 101, the first position detecting circuit 104 and the second position detecting circuit 106.

The first driving circuit 103 is connected with the piezoelectric element 12 of the first actuator 10 and causes the driving member 13 to elongate and shrink by applying a specified drive voltage to the piezoelectric element 12, thereby driving the driven member 14.

The first position detecting circuit 104 causes a first LED 3 to emit light. A light current corresponding to a light-receiving position on a light-receiving surface of a first PSD 5 is inputted to the first position detecting circuit 104, which in turn detects the position of the first driven member 14 based on the received light current.

The second driving circuit 105 is connected with the piezoelectric element 22 of the second actuator 20 and causes the driving member 23 to elongate and shrink by applying a specified drive voltage to the piezoelectric element 22, thereby driving the driven member 24.

The second position detecting circuit 106 causes a second LED 4 to emit light. A light current corresponding to a light-receiving position on a light-receiving surface of a second PSD 6 is inputted to the second position detecting circuit 106, which in turn detects the position of the position of the second driven member 24 based on the received light current.

No description is given on the entire processing of this embodiment since it is the same as the entire processing shown in FIG. 3, and only an initial checking processing in Step S2 is described.

Figure 21:
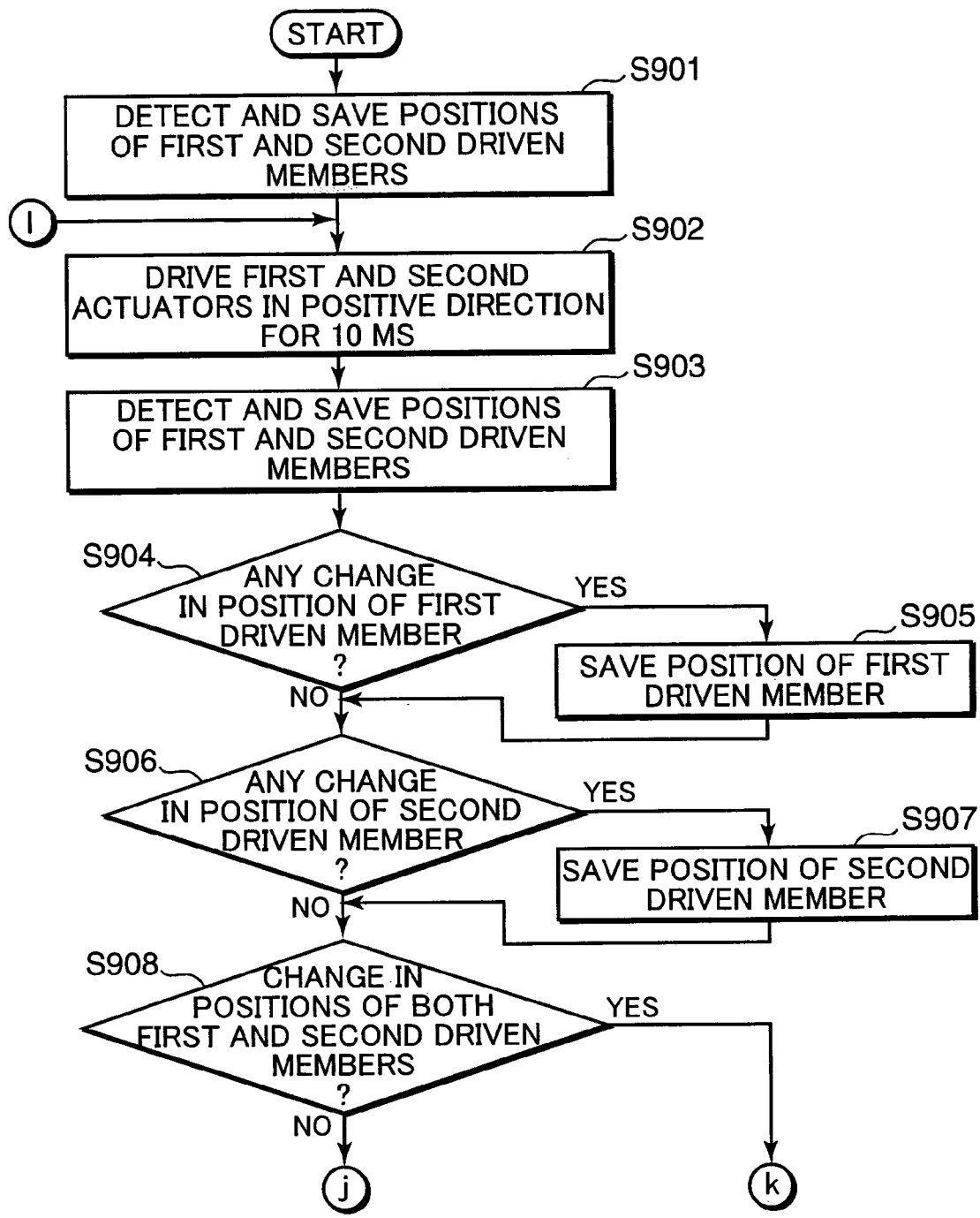
FIGS. 21 and 22 are a flowchart showing an initial checking processing for the driving mechanism shown in FIG. 20.
Figure 22:
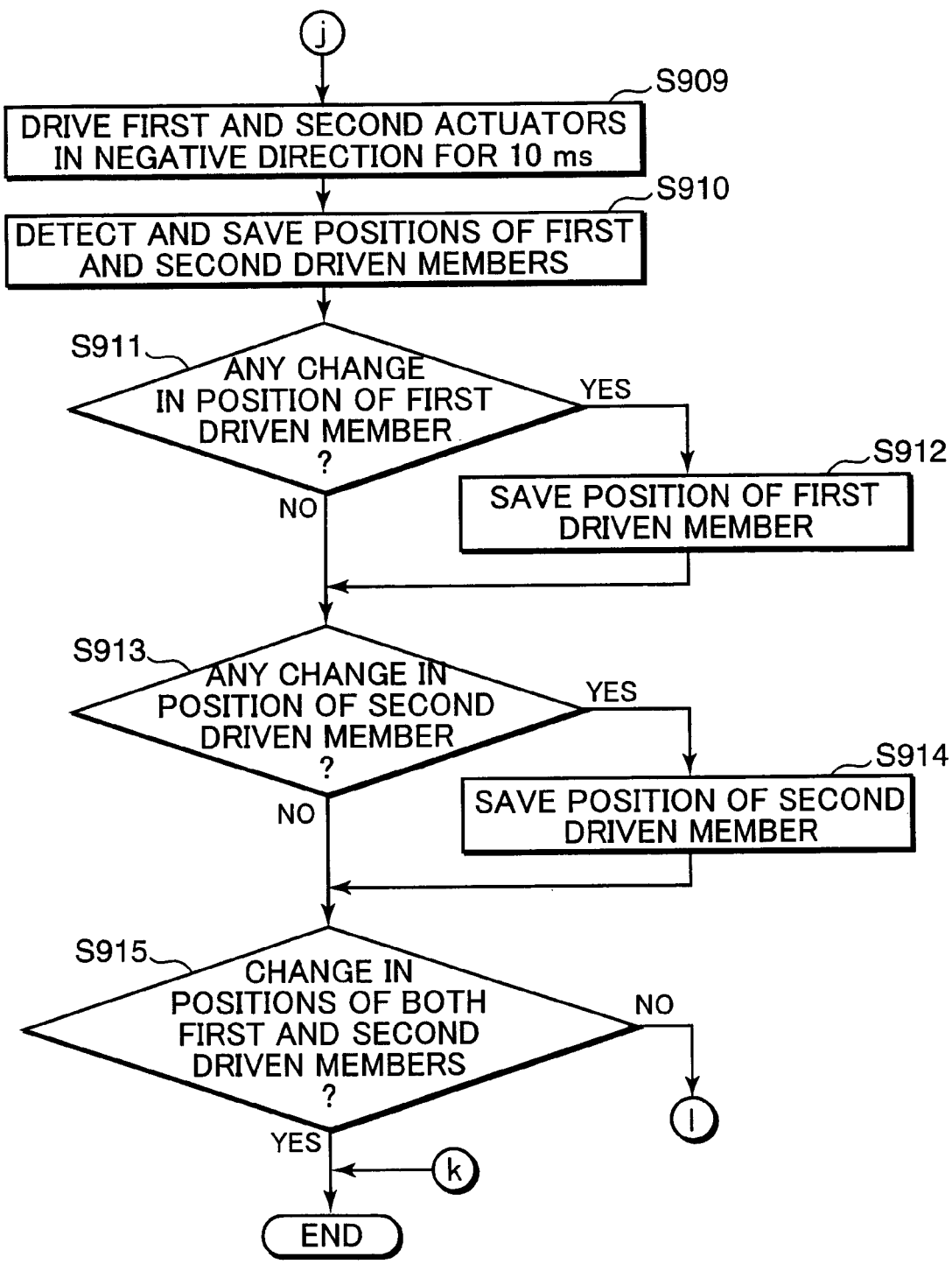

Referring to FIGS. 21 and 22 where it should be noted that j, k, l in FIG. 21 correspond to j, k, l in FIG. 22, in Step S901, the first position detecting circuit 104 detects an initial position of the first driven member 14 and outputs the detected initial position to the control circuit 102. The control circuit 102 saves the initial position of the first driven member 14 received from the first position detecting circuit 104. Further, the second position detecting circuit 106 detects an initial position of the second driven member 24 and outputs the detected initial position to the control circuit 102. The control circuit 102 saves the initial position of the second driven member 24 received from the second position detecting circuit 106.

In Step S902, the control circuit 102 simultaneously drives the first and second actuators 10, 20 in positive direction for a specified period. Although the specified period during which the control circuit 102 simultaneously drives the first and second actuators 10, 20 in positive direction is 10 ms in this embodiment, the present invention is not limited thereto. For example, a suitable period obtained by an experiment on driving may be set.

In Step S903, the first position detecting circuit 104 detects the position of the first driven member 14 and outputs the detected position to the control circuit 102. The control circuit 102 saves the position of the first driven member 14 received from the first position detecting circuit 104. Further, the second position detecting circuit 106 detects the position of the second driven member 24 and outputs the detected position to the control circuit 102. The control circuit 102 saves the position of the second driven member 24 received from the second position detecting circuit 106.

In Step S904, the control circuit 102 compares the position of the first driven member 14 after the actuators 10, 20 were driven and the initial position of the first driven member 14 and judges whether the first driven member 14 has moved. Here, if the position of the first driven member 14 after the actuators 10, 20 were driven and the initial position of the first driven member 14 differ, i.e., if the position of the first driven member 14 has changed from the initial position (YES in Step S904), Step S905 follows. If these two positions coincide, i.e., if the position of the first driven member 14 has not changed from the initial position (NO in Step S904), Step S906 follows.

In Step S905, the control circuit 102 saves a change in the position of the first driven member 14. In other words, the control circuit 102 saves the position of the driven member 14 moved from the initial position after simultaneously driving the first and second actuators 10, 20 in positive direction for the specified period.

In Step S906, the control circuit 102 compares the position of the second driven member 24 after the actuators 10, 20 were driven and the initial position of the second driven member 24 and judges whether the second driven member 24 has moved. Here, if the position of the second driven member 24 after the actuators 10, 20 were driven and the initial position of the second driven member 24 differ, i.e., if the position of the second driven member 24 has changed from the initial position (YES in Step S906), Step S907 follows. If these two positions coincide, i.e., if the position of the second driven member 24 has not changed from the initial position (NO in Step S906), Step S908 follows.

In Step S907, the control circuit 102 saves a change in the position of the second driven member 24. In other words, the control circuit 102 saves the position of the driven member 24 moved from the initial position after simultaneously driving the second and second actuators 10, 20 in positive direction for the specified period.

In Step S908, the control circuit 102 judges whether both first and second driven members 14, 24 have moved. Here, if the positions of both first and second driven members 14, 24 have changed (YES in Step S908), this processing is completed since the first and second actuators 10, 20 both properly operate. If the position of neither the first driven member 14 nor the second driven member 24 has changed, if the position of only the first driven member 14 has changed without changing that of the second driven member 24 and if the position of only the second driven member 24 has changed without changing that of the first driven member 14 (NO in Step S908), Step S909 follows to drive the first and second actuators 10, 20 again.

In Step S909, the control circuit 102 simultaneously drives the first and second actuators 10, 20 in negative direction for a specified period. Although the specified period during which the control circuit 102 simultaneously drives the first and second actuators 10, 20 in negative direction is 10 ms in this embodiment, the present invention is not limited thereto. For example, a suitable period obtained by an experiment on driving may be set.

In Step S910, the position detecting circuit 104 detects the position of the first driven member 14 and outputs the detected position to the control circuit 102. The control circuit 102 saves the position of the first driven member 14 received from the first position detecting circuit 104. Further, the position detecting circuit 106 detects the position of the second driven member 24 and outputs the detected position to the control circuit 102. The control circuit 102 saves the position of the second driven member 24 received from the second position detecting circuit 106.

In Step S911, the control circuit 102 compares the position of the first driven member 14 after the actuators 10, 20 were driven in negative direction and the position thereof before the actuators 10, 20 were driven in negative direction (after driving in positive direction) and judges whether the first driven member 14 has moved. Here, if the positions of the first driven member 14 after and before the actuators 10, 20 were driven in negative direction differ, i.e., if the position of the first driven member 14 after the actuators 10, 20 were driven in negative direction has changed from the position thereof before the actuators 10, 20 were driven in negative direction (YES in Step S911), Step S912 follows. If these two positions coincide, i.e., if the position of the first driven member 14 after the actuators 10, 20 were driven in negative direction has not changed from the position thereof before the actuators 10, 20 were driven in negative direction (NO in Step S911), Step S913 follows.

In Step S912, the control circuit 102 saves a change in the position of the first driven member 14. In other words, the control circuit 102 saves the position of the driven member 14 moved from the initial position after simultaneously driving the first and second actuators 10, 20 in negative direction for the specified period.

In Step S913, the control circuit 102 compares the position of the second driven member 24 after the actuators 10, 20 were driven in negative direction and the position thereof before the actuators 10, 20 were driven in negative direction (after driving in positive direction) and judges whether the second driven member 24 has moved. Here, if the positions of the second driven member 24 after and before the actuators 10, 20 were driven in negative direction differ, i.e., if the position of the second driven member 24 after the actuators 10, 20 were driven in negative direction has changed from the position thereof before the actuators 10, 20 were driven in negative direction (YES in Step S913), Step S914 follows. If these two positions coincide, i.e., if the position of the second driven member 24 after the actuators 10, 20 were driven in negative direction has not changed from the position thereof before the actuators 10, 20 were driven in negative direction (NO in Step S913), Step S915 follows.

In Step S914, the control circuit 102 saves a change in the position of the second driven member 24. In other words, the control circuit 102 saves the position of the driven member 24 moved from the initial position after simultaneously driving the first and second actuators 10, 20 in negative direction for the specified period.

In Step S915, the control circuit 102 judges whether both first and second driven members 14, 24 have moved. Here, if the positions of both first and second driven members 14, 24 have changed (YES in Step S915), this processing is completed since the first and second actuators 10, 20 both properly operate. If the position of neither the first driven member 14 nor the second driven member 24 has moved, if the position of only the first driven member 14 has changed without changing that of the second driven member 24 and if the position of only the second driven member 24 has changed without changing that of the first driven member 14 (NO in Step S915), Step S902 follows to drive the first and second actuators 10, 20 again.

In this embodiment, if the judgment result is negative in Step S915, Step S902 follows to perform the operations in Step S902 and succeeding Steps again. However, if either one of the first actuator 10 for moving the first driven member 14 and the second actuator 20 for moving the second driven member 24 was properly driven in the first processing of Steps S902 to S915, only the actuator not having been properly driven may be driven without driving the actuator having been properly driven in the next processing of Steps S902 to S915.

Alternatively, in this embodiment, if at least one of the first actuator 10 for moving the first driven member 14 and the second actuator 20 for moving the second driven member 24 was not properly driven in the first processing of Steps S902 to S915, the first and second actuators 10, 20 may be driven at a higher drive torque in the next processing of Steps S902 to S915 than in the first processing.

In this way, in the multiple-degree-of-freedom driving mechanism in which the first actuator 10 including the first driven member 14 and the first driving member 13 held by the frictional engagement and the second actuator 20 including the second driven member 24 and the second driving member 23 held by the frictional engagement are combined, the first and second actuators 10, 20 are simultaneously driven to detect the positions of the first and second driven members 14, 24. Here, if at least one of the first and second driven members 14, 24 has moved, the first and second actuators 10, 20 are simultaneously driven again and repeatedly simultaneously driven until the first and second driven members 14, 24 are judged to have both moved. If the first and second driven members 14, 24 are judged to have both moved, the first and second actuators 10, 20 perform their original operations.

Accordingly, in the case that the first driven member 14 and the first driving member 13 are adhered to each other in the first actuator 10 in which the first driven member 14 and the first driving member 13 are held by the frictional engagement or the second driven member 24 and the second driving member 23 are adhered to each other in the second actuator 20 in which the second driven member 24 and the second driving member 23 are held by the frictional engagement, vibration during the driving of the first actuator 10 is transmitted to the second actuator 20 while vibration during the driving of the second actuator 20 is transmitted to the first actuator 10 by simultaneously driving the first and second actuators 10, 20. Thus, the first driven member 14 and the first driving member 13 of the first actuator 10 or the second driven member 24 and the second driving member 23 of the second actuator 20 can be released from the adhered state by the transmitted vibrations. Therefore, the first and second actuators 10, 20 can be properly driven.

Next, a modification of the fifth embodiment is described. In the fifth embodiment, the vibration of one actuator is transmitted to the other actuator by simultaneously driving the first and second actuators 10, 20, thereby releasing the actuators 10, 20 from the adhered states. However, in the modification, the first and second actuators 10, 20 are successively driven to transmit the vibration of one actuator to the other actuator, thereby releasing the actuators 10, 20 from the adhered states.

No description is given on a driving controller of the modification of the fifth embodiment since it differs from that of the fifth embodiment only in the control algorithm of the driving controller. Only an initial checking processing different from that of the fifth embodiment is described here.

Figure 23:
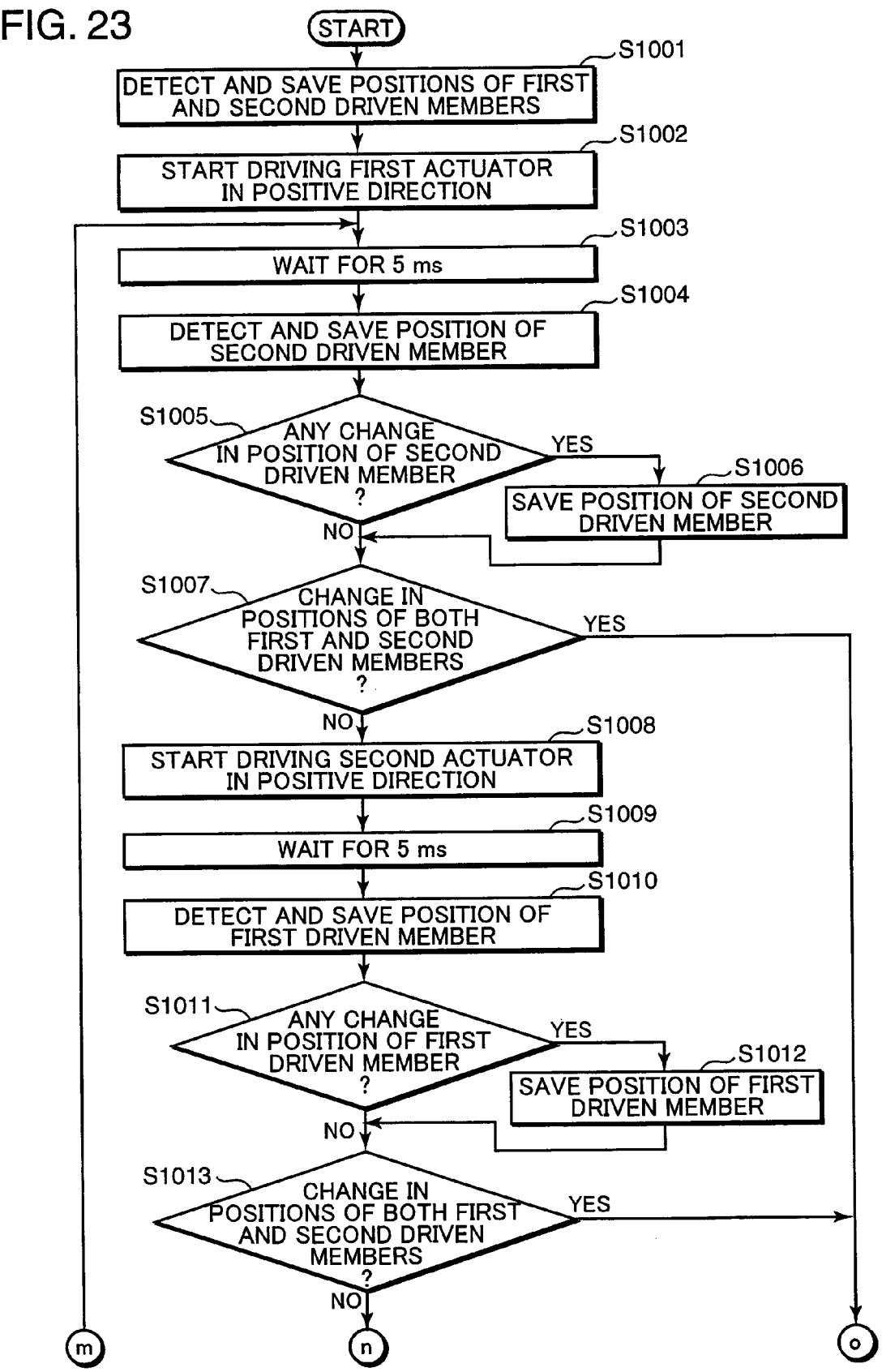
FIGS. 23 and 24 are a flowchart showing a modified initial checking processing for the driving mechanism shown in FIG. 20.
Figure 24:
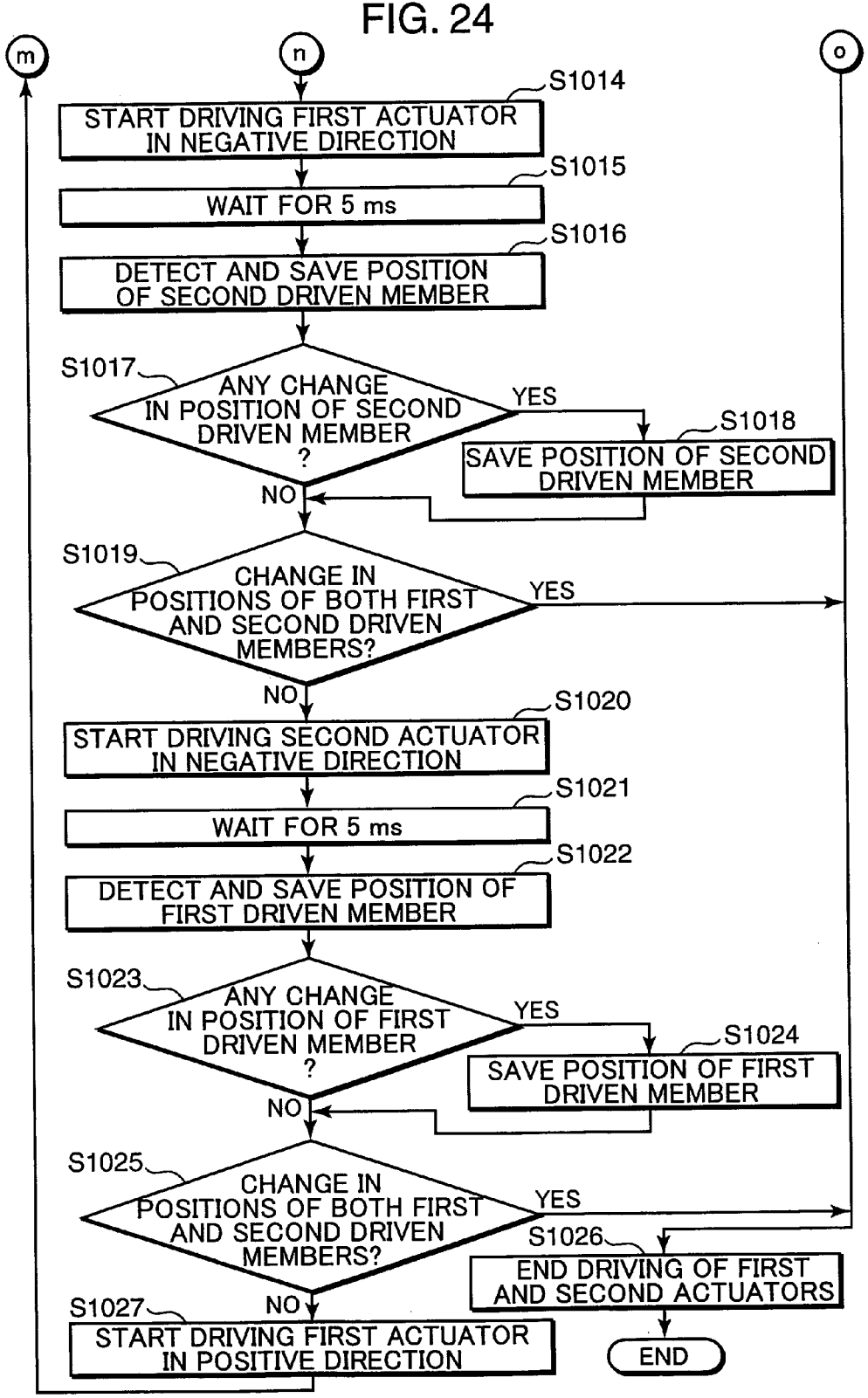

Referring to FIGS. 23 and 24 where it should be noted that m, n, o, in FIG. 23 correspond to m, n, o in FIG. 24, in Step S1001, the first position detecting circuit 104 detects an initial position of the first driven member 14 and outputs the detected initial position to the control circuit 102. The control circuit 102 saves the initial position of the first driven member 14 received from the first position detecting circuit 104. Further, the second position detecting circuit 106 detects an initial position of the second driven member 24 and outputs the detected initial position to the control circuit 102. The control circuit 102 saves the initial position of the second driven member 24 received from the second position detecting circuit 106.

In Step S1002, the control circuit 102 starts driving the first actuator 10 in positive direction.

After the lapse of a specified period following the start of driving the first actuator 10 in positive direction (Step S1003), the second position detecting circuit 106 detects a position of the second driven member 24 and outputs the detected initial position to the control circuit 102 in Step S1004. The control circuit 102 saves the initial position of the second driven member 24 received from the second position detecting circuit 106. Although the specified period lasting until the second position detecting circuit 106 detects the position of the second driven member 24 after the control circuit 102 started driving the first actuator 10 in positive direction is 5 ms in this modification, the present invention is not limited thereto. For example, a suitable period obtained by an experiment on driving may be set.

In Step S1005, the control circuit 102 compares the position of the second driven member 24 after the first actuator 10 was driven and the initial position thereof and judges whether the second driven member 24 has moved. Here, if the position of the second driven member 24 after the first actuator 10 was driven and the initial position thereof differ, i.e., if the position of the second driven member 24 has changed from the initial position (YES in Step S1005), Step S1006 follows. If these two positions coincide, i.e., if the position of the second driven member 24 has not changed from the initial position (NO in Step S1005), Step S1007 follows. It should be noted that the second driven member 24 does not move when the initial checking processing is performed at first since the second actuator 20 is not driven and, therefore, the judgment result in Step S1005 is negative.

In Step S1006, the control circuit 102 saves a change in the position of the second driven member 24. In other words, the control circuit 102 saves the position of the driven member 24 moved from the initial position in the case that the position of the second driven member 24 has changed.

In Step S1007, the control circuit 102 judges whether both first and second driven members 14, 24 have moved. Here, if the positions of both first and second driven members 14, 24 have changed (YES in Step S1007), Step S1026 follows since the first and second actuators 10, 20 both properly operate. If the position of neither the first driven member 14 or the second driven member 24 has changed, if the position of the first driven member 14 has changed without changing that of the second driven member 24, and if the position of the second driven member 14 has changed without changing that of the first driven member 14 (NO in Step S1007), Step S1008 follows to drive the second actuator 20 in positive direction. It should be noted that the second driven member 24 does not move when the initial checking processing is performed at first since the second actuator 20 is not driven and the first driven member 14 does not move, either, since the position of the first driven member 14 after the actuator 10 was driven is not detected and, therefore, the judgment result in Step S1007 is negative.

In Step S1008, the control circuit 102 starts driving the second actuator 20 in positive direction.

After the lapse of a specified period following the start of driving the second actuator 20 in positive direction (Step S1009), the first position detecting circuit 104 detects a position of the first driven member 14 and outputs the detected position to the control circuit 102 in Step S1010. The control circuit 102 saves the position of the first driven member 14 received from the first position detecting circuit 104. Although the specified period lasting until the first position detecting circuit 104 detects the position of the first driven member 14 after the control circuit 102 started driving the second actuator 20 in positive direction is 5 ms in this modification, the present invention is not limited thereto. For example, a suitable period obtained by an experiment on driving may be set.

In Step S1011, the control circuit 102 compares the position of the first driven member 14 after the second actuator 20 was driven and the initial position thereof and judges whether the first driven member 14 has moved. Here, if the position of the first driven member 14 after the second actuator 20 was driven and the initial position thereof differ, i.e., if the position of the first driven member 14 has changed from the initial position (YES in Step S1011), Step S1012 follows. If these two positions coincide, i.e., if the position of the first driven member 14 has not changed from the initial position (NO in Step S1011), Step S1013 follows.

In Step S1012, the control circuit 102 saves a change in the position of the first driven member 14. In other words, the control circuit 102 saves the position of the driven member 14 moved from the initial position in the case that the position of the first driven member 14 has changed.

In Step S1013, the control circuit 102 judges whether both first and second driven members 14, 24 have moved. Here, if the positions of both first and second driven members 14, 24 have changed (YES in Step S1013), Step S1026 follows since the first and second actuators 10, 20 both properly operate. If the position of neither the first driven member 14 nor the second driven member 24 has changed, if the position of the first driven member 14 has changed without changing that of the second driven member 24, and if the position of the second driven member 14 has changed without changing that of the first driven member 14 (NO in Step S1013), Step S1014 follows to drive the first actuator 10 in negative direction.

In Step S1014, the control circuit 102 starts driving the first actuator 10 in negative direction.

After the lapse of a specified period following the start of driving the first actuator 10 in negative direction (Step S1015), the second position detecting circuit 106 detects the position of the second driven member 24 and outputs the detected position to the control circuit 102 in Step S1016. The control circuit 102 saves the position of the second driven member 24 received from the second position detecting circuit 106. Although the specified period lasting until the second position detecting circuit 106 detects the position of the second driven member 24 after the control circuit 102 started driving the first actuator 10 in negative direction is 5 ms in this modification, the present invention is not limited thereto. For example, a suitable period obtained by an experiment on driving may be set.

In Step S1017, the control circuit 102 compares the position of the second driven member 24 after the first actuator 10 was driven and the initial position thereof and judges whether the second driven member 24 has moved. Here, if the position of the second driven member 24 after the first actuator 10 was driven and the initial position thereof differ, i.e., if the position of the second driven member 24 has changed from the initial position (YES in Step S1017), Step S1018 follows. If these two positions coincide, i.e., if the position of the second driven member 24 has not changed from the initial position (NO in Step S1017), Step S1019 follows.

In Step S1018, the control circuit 102 saves a change in the position of the second driven member 24. In other words, the control circuit 102 saves the position of the driven member 24 moved from the initial position in the case that the position of the second driven member 24 has changed.

In Step S1019, the control circuit 102 judges whether both first and second driven members 14, 24 have moved. Here, if the positions of both first and second driven members 14, 24 have changed (YES in Step S1019), Step S1026 follows since the first and second actuators 10, 20 both properly operate. If the position of neither the first driven member 14 nor the second driven member 24 has changed, if the position of the first driven member 14 has changed without changing that of the second driven member 24, and if the position of the second driven member 14 has changed without changing that of the first driven member 14 (NO in Step S1019), Step S1020 follows to drive the second actuator 20 in negative direction.

In Step S1020, the control circuit 102 starts driving the second actuator 20 in negative direction.

After the lapse of a specified period following the start of driving the second actuator 20 in negative direction (Step S1021), the first position detecting circuit 104 detects the position of the first driven member 14 and outputs the detected position to the control circuit 102 in Step S1022. The control circuit 102 saves the position of the first driven member 14 received from the first position detecting circuit 104. Although the specified period lasting until the first position detecting circuit 104 detects the position of the first driven member 14 after the control circuit 102 started driving the second actuator 20 in negative direction is 5 ms in this modification, the present invention is not particularly limited thereto. For example, a suitable period obtained by an experiment on driving may be set.

In Step S1023, the control circuit 102 compares the position of the first driven member 14 after the second actuator 20 was driven and the initial position thereof and judges whether the first driven member 14 has moved. Here, if the position of the first driven member 14 after the second actuator 20 was driven and the initial position thereof differ, i.e., if the position of the first driven member 14 has changed from the initial position (YES in Step S1023), Step S1024 follows. If these two positions coincide, i.e., if the position of the first driven member 14 has not changed from the initial position (NO in Step S1023), Step S1025 follows.

In Step S1024, the control circuit 102 saves a change in the position of the first driven member 14. In other words, the control circuit 102 saves the position of the driven member 14 moved from the initial position in the case that the position of the first driven member 14 has changed along X-axis direction.

In Step S1025, the control circuit 102 judges whether both first and second driven members 14, 24 have moved. Here, if the positions of both first and second driven members 14, 24 have changed (YES in Step S1025), Step S1026 follows since the first and second actuators 10, 20 both properly operate. If the position of neither the first driven member 14 or the second driven member 24 has changed, if the position of the first driven member 14 has changed without changing that of the second driven member 24, and if the position of the second driven member 14 has changed without changing that of the first driven member 14 (NO in Step S1025), Step S1027 follows to drive the first actuator 10 in positive direction.

In Step S1026, the control circuit 102 stops driving the first and second actuators 10, 20 since the first and second actuators 10, 20 both properly operate, thereby completing the initial checking processing.

In Step S1027, the control circuit 102 starts driving the first actuator 10 in positive direction and proceeds to Step S1003 to perform the operations in Steps S1003 and succeeding Steps.

In this modification, if either one of the first actuator 10 for moving the first driven member 14 and the second actuator 20 for moving the second driven member 24 was not properly driven in the first processing of Steps S1002 to S1025, the first and second actuators 10, 20 may be driven at a higher drive torque in the next processing of Steps S1003 to S1025 than in the first processing.

In this way, in the multiple-degree-of-freedom driving mechanism including the first actuator 10 in which the first driven member 14 and the first driving member 13 are held by the frictional engagement and the second actuator 20 in which the second driven member 24 and the second driving member 23 are held by the frictional engagement, the first and second actuators 10, 20 are successively driven to detect the positions of the first and second driven members 14, 24. Here, unless at least one of the first and second driven members 14, 24 has moved, the first and second actuators 10, 20 are successively driven again and repeatedly successively driven until the first and second driven members 14, 24 are judged to have both moved. If the first and second driven members 14, 24 are judged to have both moved, the first and second actuators 10, 20 perform their original operations.

Accordingly, in the case that the first driven member 14 and the first driving member 13 are adhered to each other in the first actuator 10 in which the first driven member 14 and the first driving member 13 are held by the frictional engagement or the second driven member 24 and the second driving member 23 are adhered to each other in the second actuator 20 in which the second driven member 24 and the second driving member 23 are held by the frictional engagement, vibration during the driving of the first actuator 10 is transmitted to the second actuator 20 while vibration during the driving of the second actuator 20 is transmitted to the first actuator 10 by successively driving the first and second actuators 10, 20. Thus, the first driven member 14 and the first driving member 13 of the first actuator 10 or the second driven member 24 and the second driving member 23 of the second actuator 20 can be released from the adhered state by the transmitted vibrations. Therefore, the first and second actuators 10, 20 can be properly driven.

Although the position detecting circuit detects the position of the driven member by an optical position detecting method using the LED and the PSD in the respective foregoing embodiments, the present invention is not limited thereto. The position of the driven member may be detected by a magnetical position detecting method.

As described above, an inventive driving controller includes a driving circuit for supplying a driving signal to a plurality of driving units physically connected with one another, at least a particular one of which includes a driving member frictionally engaged with a driven member. The driving controller is further provided with a detecting circuit which detects whether the driven member is being driven at a predetermined time; and a controlling circuit which is responsive to the detecting circuit, and controls the driving circuit to drive the particular driving unit including the driving member, and another driving unit at a predetermined timing when the detecting circuit detects the driven member is not driven at the predetermined time.

The particular driving unit having the driving member and the another driving unit may be driven at the same time. Alternatively, the particular driving unit having the driving member and the another driving unit may be driven one after another.

The particular driving unit including the driving member may be arranged at a position to receive a vibration generated by the another driving unit. The particular driving unit including the driving member and the another driving unit may be mounted on the common member.

A driving axis of the particular driving unit including the driving member may be preferably made to perpendicularly intersects a driving axis of the another driving unit.

The driving unit may be provided with an electromechanical conversion element operable to elongate and shrink in response to the driving signal from the driving circuit. The driving member is connected with the electromechanical conversion element.

The driving force of the particular driving unit having the driving member and the another driving unit may be increased in a stepwise manner.

It may be preferable to detect whether a driven member to be driven by the driving member of the another driving unit is being driven in addition to detection as to whether the driven member to be driven by the driving member of the particular driving unit. If a driven member is detected not to be driven by the detecting circuit, the driving unit corresponding to the driven member is driven.

An inventive image sensing apparatus is provided with an image sensing device including a number of pixels arrayed two-dimensionally for sensing a light image from an object to generate an electrical image signal, an optical system for focusing the light image on the image sensing device, and the above-mentioned inventive driving controller.

The particular driving unit including the driving member may be adapted for moving the image sensing device in a first direction while the another driving unit is adapted for moving the image sensing device in a second direction perpendicularly intersecting the first direction.

The particular driving unit including the driving member may be adapted for moving the optical-system along an optical-axis direction. The another driving unit may be provided with a vibrator for vibrating the apparatus.

Further, an inventive driving control method comprises the steps of detecting whether the driven member is being driven at a predetermined time, and driving the particular driving unit including the driving member, and another driving unit at a predetermined timing when the driven member is not driven at the predetermined time.

Accordingly, if the driven member and the driving member of the particular driving unit are adhered to each other, the particular driving unit and at least one of the others of the plurality of driving units are driven simultaneously or one after another at a predetermined time, e.g., at the time of turning the apparatus on or at the start of driving the one driving unit, to release the adhesion. When the particular driving unit and at least one of the others of the plurality of driving units are driven simultaneously or one after another, whether or not the driven member is being driven is detected. Unless the driving of the driven member is confirmed, the one driving unit and at least one of the others of the plurality of driving units are driven simultaneously or one after another until the driving of the driven member is confirmed. Further, if the driving of the driven member is confirmed, the one driving unit performs its original operation.

Vibration generated by driving the another driving unit is transmitted to the particular driving unit. Thus, the driven member and the driving member of the particular driving unit can be released from the adhered state by the transmitted vibration, consequently reliably eliminating operation error due to the adhesion of the driving member and the driven member.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. A driving controller for controlling driving of a plurality of driving units physically connected with one another, at least one driving unit includes a driving member frictionally engaged with a driven member, comprising:
    a driving circuit which supplies a driving signal to the plurality of driving units;
    a detecting circuit which detects whether the position of the driven member has changed at a predetermined time; and
    a controlling circuit which is responsive to the detecting circuit and which controls the driving circuit to drive the at least one driving unit including the driving member and another driving unit, the controlling circuit controls the driving circuit to drive the another driving unit when the detecting circuit detects that the position of the driven member engaged with the driving member of the at least one driving unit has not changed at a predetermined time, even though the driving circuit provides a driving signal to the at least one driving unit.

2. The driving controller according to claim 1, wherein the controlling circuit controls the driving circuit to drive the at least one driving unit having the driving member and another driving unit at the same time.

3. The driving controller according to claim 2, wherein the at least one driving unit including the driving member is arranged at a position to receive a vibration generated by the another driving unit.

4. The driving controller according to claim 2, wherein the at least one driving unit including the driving member and the another driving unit are mounted on a common member.

5. The driving controller according to claim 2, wherein a driving axis of the at least one driving unit including the driving member perpendicularly intersects a driving axis of the another driving unit.

6. The driving controller according to claim 1, wherein the controlling circuit controls the driving circuit to drive the at least one driving unit having the driving member and another driving unit one after the other.

7. The driving controller according to claim 6, wherein the at least one driving unit including the driving member is arranged at a position to receive a vibration generated by the another driving unit.

8. The driving controller according to claim 6, wherein the at least one driving unit including the driving member and the another driving unit are mounted on the common member.

9. The driving controller according to claim 1, wherein a driving axis of the at least one driving unit including the driving member perpendicularly intersects a driving axis of the another driving unit.

10. The driving controller according to claim 1, wherein the driving unit includes an electromechanical conversion element which elongates and shrinks in response to the driving signal from the driving circuit, the driving member is connected with the electromechanical conversion element.

11. The driving controller according to claim 1, wherein the controlling circuit controls the driving circuit to increase the driving force of the at least one driving unit having the driving member and the another driving unit in a stepwise manner.

12. The driving controller according to claim 1, wherein the detecting circuit detects whether a driven member to be driven by the driving member of the another driving unit is being driven in addition to detection as to whether the driven member to be driven by the driving member of the at least one driving unit, and the controlling circuit controls the driving circuit to drive a driving unit corresponding to a driven member which is detected not to be driven by the detecting circuit.

13. An image sensing apparatus comprising:
    an image sensing device which includes a number of pixels arrayed two-dimensionally, and senses a light image from an object to generate an electrical image signal;
    an optical system which focuses the light image on the image sensing device;
    a plurality of driving units wherein at least one driving unit includes a driving member frictionally engaged with a driven member mechanically connected with at least one of the image sensing device and the optical system;
    a driving circuit which supplies a driving force to the plurality of driving units;
    a detecting circuit which detects whether the position of the driven member has changed at a predetermined time; and
    a controlling circuit which is responsive to the detecting circuit and which controls the driving circuit to drive the at least one driving unit including the driving member and another driving unit, the controlling circuit controlling the driving circuit to drive the another driving unit when the detecting circuit detects that the position of the driven member engaged with the driving member of the at least one driving unit has not changed at a predetermined time, even though the driving circuit provides a driving signal to the at least one driving unit.

14. The image sensing apparatus according to claim 13, wherein the at least one driving unit including the driving member is adapted for moving the image sensing device in a first direction, and the another driving unit is adapted for moving the image sensing device in a second direction perpendicularly intersecting the first direction.

15. The image sensing apparatus according to claim 14, wherein a driving axis of the at least one driving unit including the driving member perpendicularly intersects a driving axis of the another driving unit.

16. The image sensing apparatus according to claim 13, wherein the at least one driving unit including the driving member is adapted for moving the optical-system along an optical-axis direction.

17. The image sensing apparatus according to claim 16, wherein the another driving unit includes a vibrator for vibrating the apparatus.

18. A method for controlling driving of a plurality of driving units physically connected with one another, at least one driving unit includes a driving member frictionally engaged with a driven member, comprising the steps of:
    detecting whether the position of the driven member has changed at a predetermined time; and
    driving another driving unit when the detecting circuit detects the position of the driven member engaged with the driving member of the at least one driving unit has not changed at a predetermined time, even though the driving circuit provides a driving signal to the at least one driving unit.

19. The method according to claim 18, wherein the at least one driving unit having the driving member and the another driving unit are driven at the same time.

20. The method according to claim 18, wherein the at least one driving unit having the driving member and the another driving unit are driven one after the other.

21. A driving controller for controlling driving of a plurality of driving units physically connected with one another, at least one driving unit includes a driving member frictionally engaged with a driven member, comprising:
    a driving circuit which supplies a driving signal to the plurality of driving units;
    a detecting circuit which detects whether the position of the driven member has changed at a predetermined time; and
    a controlling circuit which is responsive to the detecting circuit and which controls the driving circuit to drive the at least one driving unit including the driving member and another driving unit to release an adhered state when the frictionally engaged portion of the driving member and the driven member is adhered.

* * * * *